United States Patent
Moon et al.

(10) Patent No.: US 9,998,972 B2
(45) Date of Patent: Jun. 12, 2018

(54) RADIO RESOURCE MANAGEMENT METHOD AND APPARATUS FOR TRANSMITTING AND RECEIVING HANDOVER MESSAGE IN MOBILE COMMUNICATION SYSTEM

(71) Applicant: Samsung Electronics Co., Ltd., Suwon-si, Gyeonggi-do (KR)

(72) Inventors: Jungmin Moon, Suwon-si (KR); Nigam Anshuman, Bangalore (IN); Jungsoo Jung, Seongnam-si (KR); Sunheui Ryoo, Yongin-si (KR); Sungjin Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/032,892

(22) PCT Filed: Nov. 4, 2014

(86) PCT No.: PCT/KR2014/010484
§ 371 (c)(1),
(2) Date: May 27, 2016

(87) PCT Pub. No.: WO2015/065148
PCT Pub. Date: May 7, 2015

(65) Prior Publication Data
US 2016/0277986 A1    Sep. 22, 2016

(30) Foreign Application Priority Data
Nov. 4, 2013    (KR) ........................ 10-2013-0132879

(51) Int. Cl.
*H04W 36/00*    (2009.01)
*H04W 36/20*    (2009.01)
(Continued)

(52) U.S. Cl.
CPC ........... *H04W 36/20* (2013.01); *H04W 28/26* (2013.01); *H04W 36/0072* (2013.01);
(Continued)

(58) Field of Classification Search
CPC ...... H04W 36/20; H04W 36/18; H04W 28/26
(Continued)

(56) References Cited

U.S. PATENT DOCUMENTS

2008/0125124 A1    5/2008    Craig
2009/0042572 A1    2/2009    Craig et al.
(Continued)

FOREIGN PATENT DOCUMENTS

KR    10-2012-0105696 A    9/2012
WO    2008/096240 A1    8/2008
(Continued)

OTHER PUBLICATIONS

Research in Motion UK Limited; Improving HO performance by multicasting HO Command; 3GPP TSG RAN WG2 Meeting #81 BIS; R2-131371; Apr. 15-Apr. 19, 2013; Chicago, IL.
(Continued)

*Primary Examiner* — Chuck Huynh
(74) *Attorney, Agent, or Firm* — Jefferson IP Law, LLP

(57) ABSTRACT

Provided are a radio resource management method and apparatus for transmitting and receiving handover messages in a mobile communication system. The radio resource management method for a source base station (source ENB) handling handover in a mobile communication system may include: determining resource information for silencing so that at least one ENB does not perform downlink or uplink transmission when a handover related message is sent or received for handover processing; determining to handover a user equipment (UE); and carrying out handover for the UE according to the determined resource information.

16 Claims, 16 Drawing Sheets

(51) Int. Cl.
*H04W 36/08* (2009.01)
*H04W 28/26* (2009.01)
*H04W 72/04* (2009.01)

(52) U.S. Cl.
CPC ......... *H04W 36/08* (2013.01); *H04W 72/048* (2013.01); *H04W 72/0413* (2013.01); *H04W 72/0426* (2013.01)

(58) Field of Classification Search
USPC .................................. 455/437, 453; 370/332
See application file for complete search history.

(56) References Cited

U.S. PATENT DOCUMENTS

| | | |
|---|---|---|
| 2011/0312319 A1 | 12/2011 | Lindoff et al. |
| 2012/0113918 A1 | 5/2012 | Freda et al. |
| 2012/0236800 A1 | 9/2012 | Park et al. |
| 2013/0023302 A1 | 1/2013 | Sivanesan et al. |
| 2013/0072196 A1* | 3/2013 | Jung ..................... H04W 36/30 455/437 |
| 2013/0208587 A1 | 8/2013 | Bala et al. |
| 2013/0223409 A1 | 8/2013 | Jung et al. |
| 2015/0023194 A1 | 1/2015 | Seo et al. |
| 2015/0223135 A1* | 8/2015 | Ratasuk ................ H04W 16/32 455/436 |

FOREIGN PATENT DOCUMENTS

| | | |
|---|---|---|
| WO | 2012/061484 A2 | 5/2012 |
| WO | 2013/105810 A1 | 7/2013 |
| WO | 2013/112983 A2 | 8/2013 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP Standard; 3GPP TS 36.300, 3rdGeneration Partnership Project (3GPP), Mobile Competence Centre; 650, XP050712360, Sep. 9, 2013.

* cited by examiner

FIG. 5
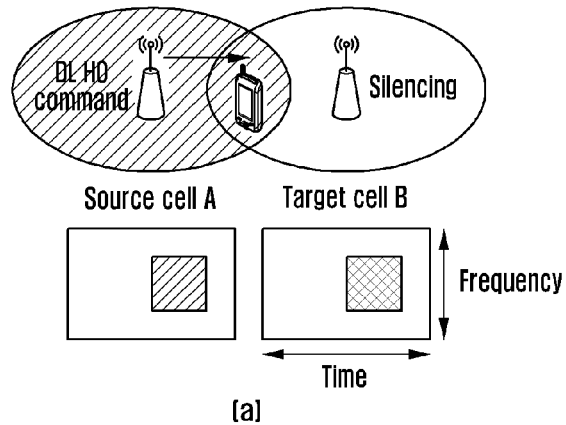
[a]
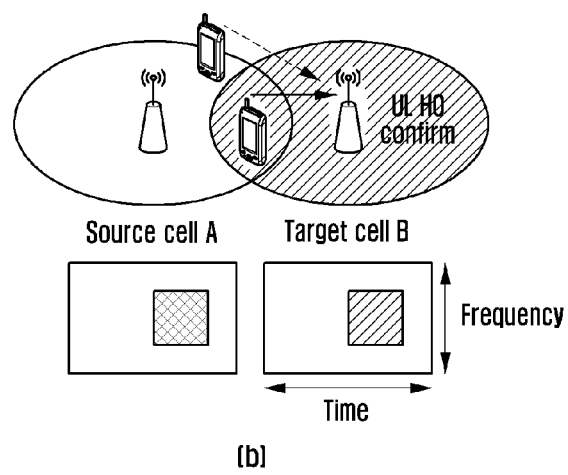
[b]
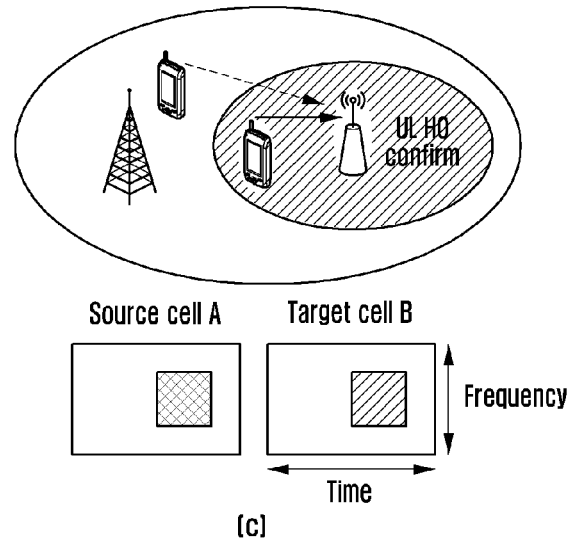
[c]

RADIO RESOURCE MANAGEMENT METHOD AND APPARATUS FOR TRANSMITTING AND RECEIVING HANDOVER MESSAGE IN MOBILE COMMUNICATION SYSTEM

TECHNICAL FIELD

The present invention relates to a mobile communication system and, more particularly, to a method and apparatus for radio resource management to transmit and receive handover messages.

BACKGROUND ART

Typical mobile communication systems have been developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

In general, when reception from the serving cell becomes poor or a neighbor cell with reception signal strength higher than that of the serving cell is discovered, a user equipment (UE) performs handover to the neighbor cell.

Messages exchanged using radio resources during handover may include a handover command message and a handover confirm message. When such a handover related message is lost during handover, handover performance may be delayed. This may increase the service interruption time.

Particularly, in a heterogeneous network where multiple small cells are deployed in the coverage of a macro cell, handovers may occur more frequently, significantly increasing the frequency of failure in transmission and reception of handover related messages.

Hence, it is necessary to develop a method that enables more efficient transmission and reception of handover related messages.

DISCLOSURE OF INVENTION

Technical Problem

The present invention has been made in view of the above problems. Accordingly, an aspect of the present invention is to provide a method and apparatus that enable efficient transmission and reception of handover messages in an environment where macro cells coexist with small cells.

More specifically, an aspect of the present invention is to provide a method and apparatus that enable base stations to efficiently allocate radio resources needed for transmission and reception of handover messages to user equipments and enable the user equipments and base stations to successfully transmit and receive handover messages so that the handover procedure is completed rapidly.

Solution to Problem

In accordance with an aspect of the present invention, there is provided a method of radio resource management for a source base station (source ENB) handling handover in a mobile communication system. The method may include: determining resource information for silencing so that at least one ENB does not perform downlink or uplink transmission when a handover related message is sent or received for handover processing; determining to handover a user equipment (UE); and carrying out handover for the UE according to the determined resource information.

In accordance with another aspect of the present invention, there is provided a method of radio resource management for a target base station (target ENB) handling handover in a mobile communication system. The method may include: determining resource information for silencing so that at least one ENB does not perform downlink or uplink transmission when a handover related message is sent or received for handover processing; receiving a handover request message for a user equipment (UE) from a source ENB; and carrying out handover for the UE according to the determined resource information.

In accordance with another aspect of the present invention, there is provided a source base station (source ENB) managing radio resources for handling handover in a mobile communication system. The source ENB may include: a transceiver unit to send and receive signals to and from a user equipment (UE) and a neighbor ENB; and a control unit to control a process of determining resource information for silencing so that at least one ENB does not perform downlink or uplink transmission when a handover related message is sent or received for handover processing, determining to handover a UE, and carrying out handover for the UE according to the determined resource information.

In accordance with another aspect of the present invention, there is provided a target base station (target ENB) managing radio resources for handling handover in a mobile communication system. The target ENB may include: a transceiver unit to send and receive signals to and from a user equipment (UE) and one or more ENBs; and a control unit to control a process of determining resource information for silencing so that at least one ENB does not perform downlink or uplink transmission when a handover related message is sent or received for handover processing, receiving a handover request message for a user equipment (UE) from a source ENB, and carrying out handover for the UE according to the determined resource information.

Advantageous Effects of Invention

In a feature of the present invention, it is possible to reduce interference between cells by use of a silencing technique when the source base station sends the UE a handover command message or the UE sends the target base station a handover confirm message. This may increase the probability of successfully receiving handover related messages and may prevent handover delay. In addition, as the probability of handover failure is reduced, the quality of service (QoS) for the user can be improved.

BRIEF DESCRIPTION OF DRAWINGS

FIG. 5 illustrates a silencing technique according to an embodiment of the present invention.

MODE FOR THE INVENTION

Figure 1:
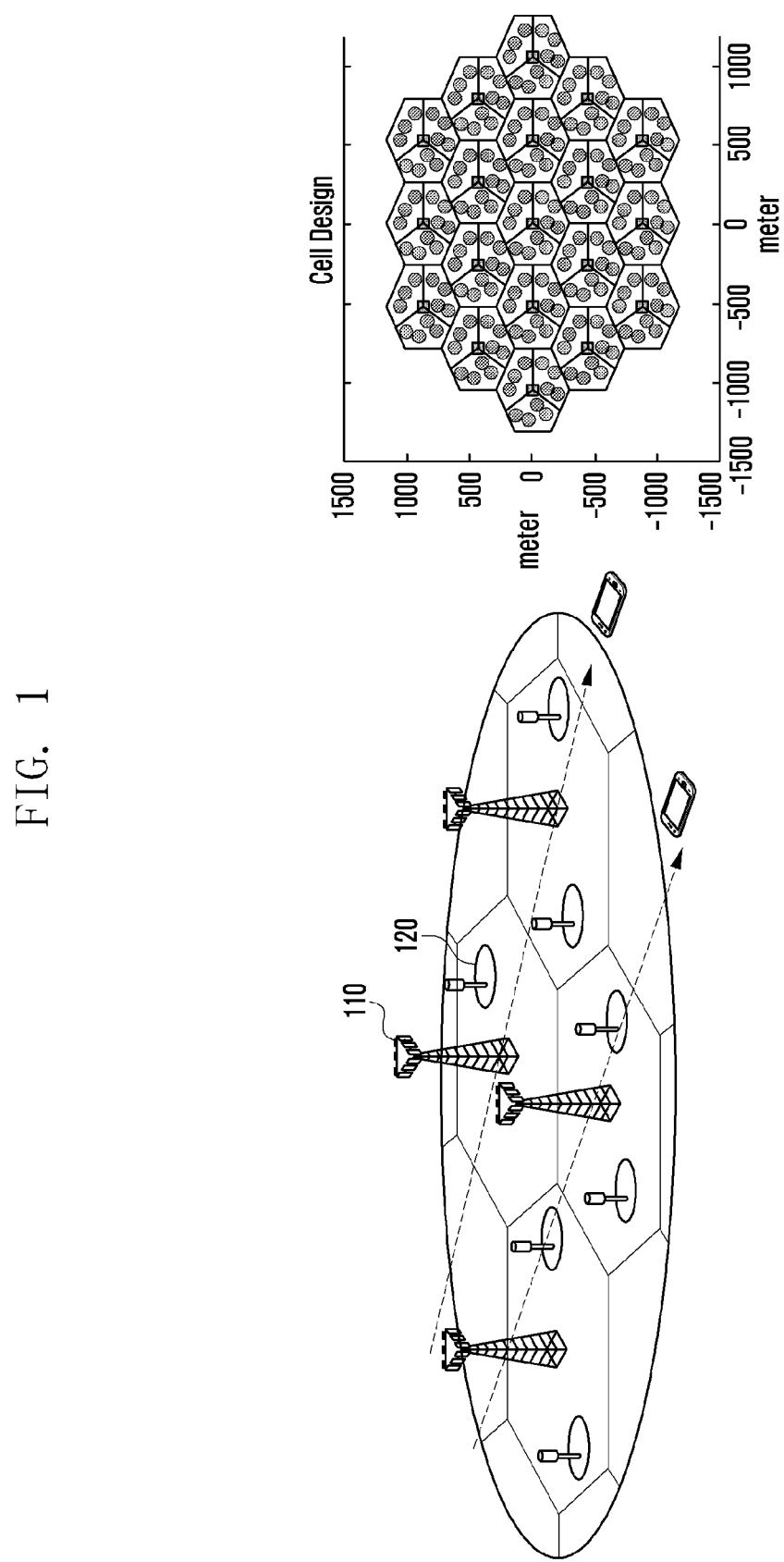
FIG. 1 illustrates a mobile communication network environment to which an embodiment of the present invention is applied.

In the following description of various embodiments of the present invention, detailed descriptions of well-known functions and structures incorporated herein may be omitted to avoid obscuring the subject matter of the present invention.

In the drawings, some elements are exaggerated, omitted, or only outlined in brief, and thus may be not drawn to scale. The same or similar reference symbols are used throughout the drawings to refer to the same or like parts.

The aspects, features and advantages of certain embodiments of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

Hereinafter, preferred embodiments of the present invention are described in detail with reference to the accompanying drawings. The same or similar reference symbols are used throughout the drawings to refer to the same or like parts. Descriptions of well-known functions and constructions may be omitted for clarity and conciseness.

FIG. 1 illustrates a mobile communication network environment to which an embodiment of the present invention is applied.

As shown in FIG. 1, the mobile communication network of the present invention may include macro cells 110 and small cells 120.

The network environment in which macro cells coexist with small cells may be referred to as a heterogeneous network. In a heterogeneous network, handovers may occur frequently from a macro cell to a macro cell, from a macro cell to a small cell, from a small cell to a macro cell, from a small cell to a small cell.

Embodiments of the present invention described below may be applied to cases where the source and target cells use the same frequency band among the types of handovers described above.

Next, a description is given of a method that enables base stations (ENBs) to efficiently allocate radio resources needed for transmission and reception of handover related messages to a user equipment (UE) and enables the UE and ENBs to successfully transmit and receive handover related messages so that the handover procedure is completed rapidly.

Figure 2:
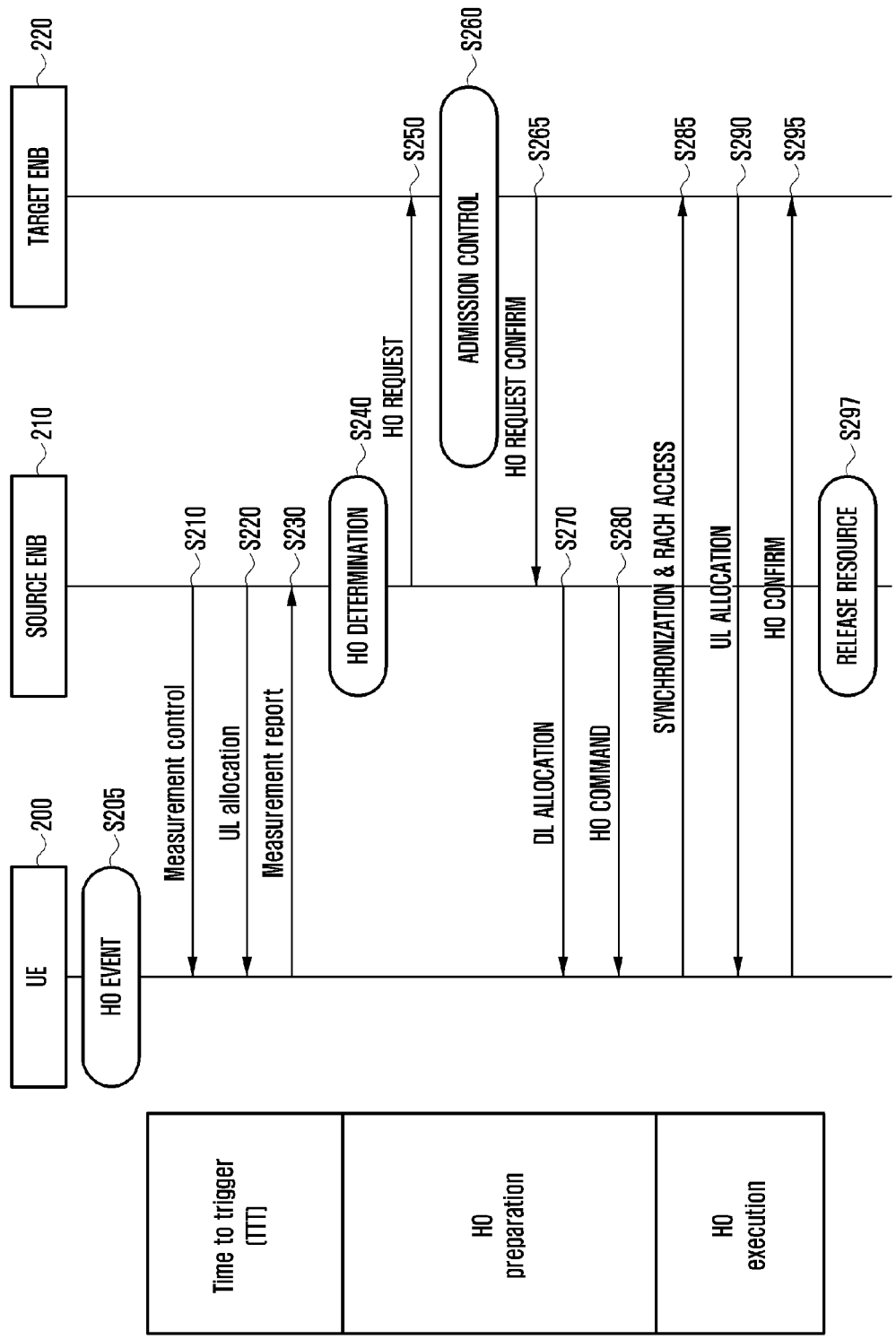
FIG. 2 is a sequence diagram illustrating a handover procedure in a mobile communication system.

FIG. 2 is a sequence diagram illustrating a handover procedure in a mobile communication system.

At step S205, the UE 200 measures downlink signal strength and detects a handover event.

At step S210, the source ENB 210 sends measurement control information to the UE 200. At step S220, the source ENB 210 allocates uplink resources for measurement reporting.

Thereafter, at step S230, the UE 200 sends the source ENB 210 a measurement report message containing results of measurement on at least one of the source ENB 210 and the target ENB 220.

At step S240, the source ENB 210 determines whether to handover the UE 200 on the basis of the received measurement report. Upon determining to handover the UE 200, at step S250, the source ENB 210 sends a handover request message for the UE 200 to the target ENB 220.

Upon reception of the handover request, at step S260, the target ENB 220 performs admission control to determine whether to accept the handover request. Upon determining to accept the handover request, at step S265, the target ENB 220 sends a handover request confirm message to the source ENB 210.

At step S270, the source ENB 210 sends the UE 200 downlink resource allocation information for handover. At step S280, the source ENB 210 sends the UE 200 a handover command message.

Thereafter, the UE 200 performs subsequent operations of the handover procedure. Specifically, at step S285, the UE 200 performs the synchronization and RACH procedure with the target ENB 220. After synchronization and RACH, at step S290, the UE 200 receives uplink resource allocation information from the target ENB 220. At step S295, the UE 200 sends a handover confirm message to the target ENB 220.

After handover of the UE 200, at step S297, the source ENB 210 releases resources having been allocated to the UE 200.

Messages transmitted through the air interfaces of the UE and ENBs during the handover procedure include a handover command message (sent from the source ENB to the UE) and a handover confirm message (sent from the UE to the target ENB). In the following description of embodiments, the handover command message and the handover confirm message may be referred to as a handover related message.

When such a handover related message is lost during handover, handover performance may be delayed. This may increase the service interruption time.

Hence, it is very important to successfully transmit and receive handover related messages between UEs and ENBs.

Compared with a network environment where only macro cells are deployed, handovers may occur more frequently and inter-cell interference may be more severe in a heterogeneous network environment where multiple small cells are deployed in the area of a macro cell.

Consequently, the frequency of failure in transmission and reception of handover related messages between UEs and ENBs may significantly increase in a heterogeneous network environment.

Figure 3:
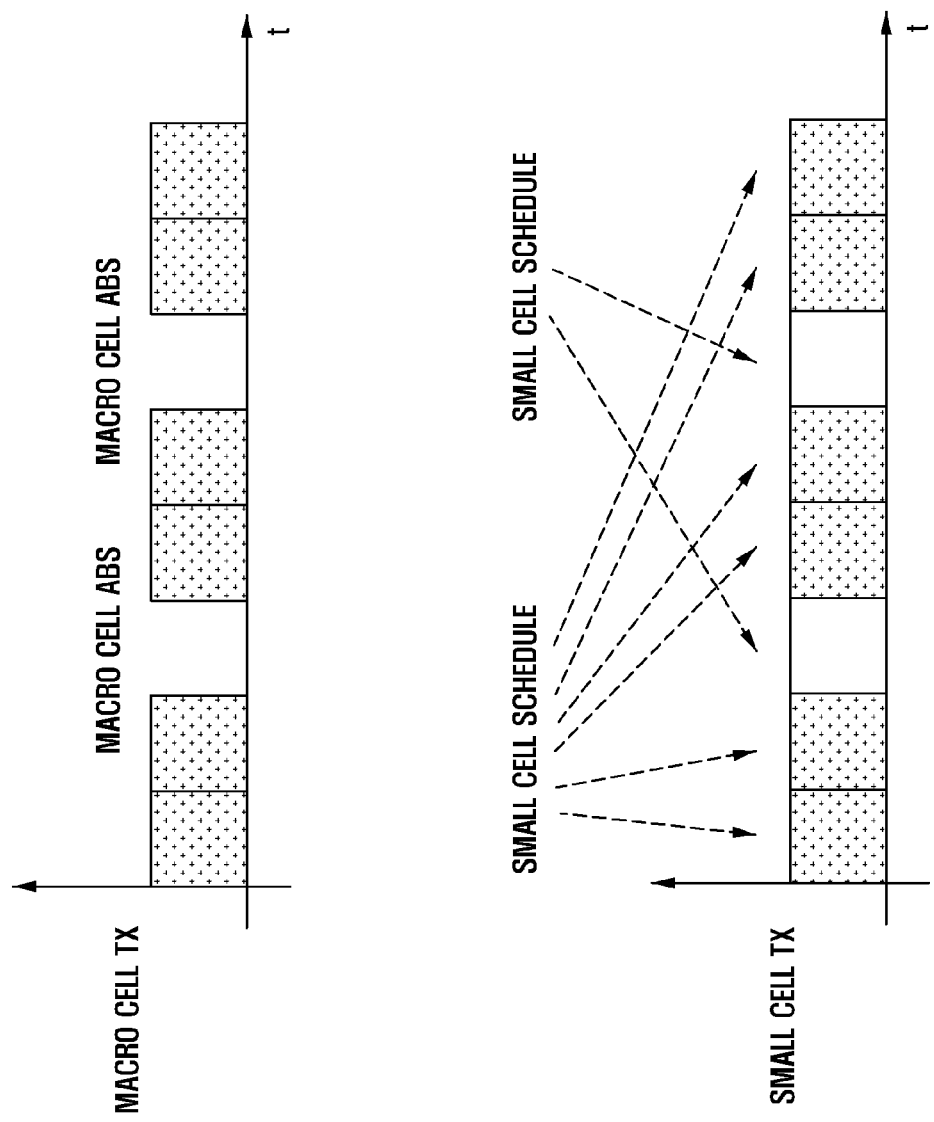
FIG. 3 illustrates transmission and reception of handover related messages using almost blank subframes (ABSs).
Figure 4:
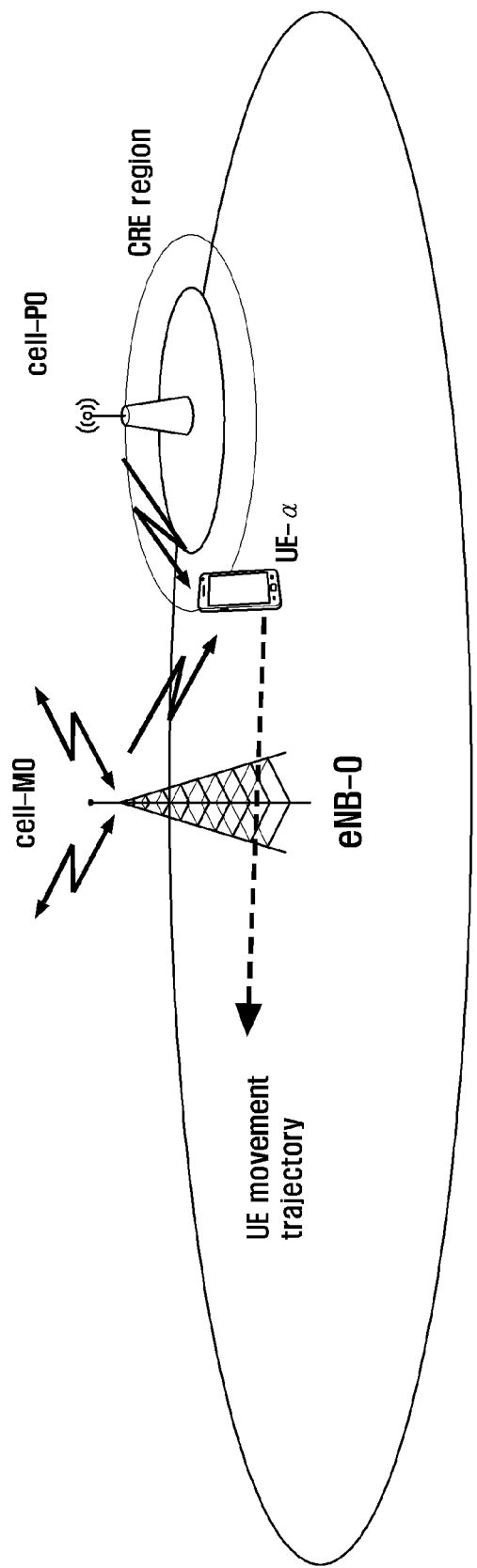
FIG. 4 illustrates multicasting of a handover command message.

Next, a description is given of schemes to address the above problem with reference to FIGS. 3 and 4.

FIG. 3 illustrates transmission and reception of handover related messages using almost blank subframes (ABSs).

An ABS refers to a subframe that includes minimal information needed for system operation only such as control channels and cell-specific reference signals without user data. ABSs are mainly used to reduce interference between macro cells and small cells in a heterogeneous network.

As shown in FIG. 3, when ABSs are allocated by a macro cell to a UE having a high probability of handover (i.e. UE at the small cell edge), the UE may send and receive handover related messages with avoidance of interference caused by the macro cell.

FIG. 4 illustrates multicasting of a handover command message.

In the scheme shown in FIG. 4, when a UE is handed over from a source ENB to a target ENB, the source ENB and the target ENB multicast a handover command message at the same time by use of the same resources.

When a UE performs handover, the target ENB is normally an ENB with the strongest signal strength for the UE. If the target ENB transmits a signal different from that of the source ENB, the UE may experience significant interference. On the contrary, if the target ENB transmits a signal identical to that of the source ENB, the received power of a desired signal for the UE may increase with avoidance of interference.

Thereby, it is possible to increase the probability that the UE successfully receives the handover command message.

Next, in addition to the above schemes, a description is given of a method that enables ENBs to efficiently allocate radio resources needed for transmission and reception of handover related messages to a UE and enables the UE and ENBs to successfully transmit and receive handover related messages so that the handover procedure is completed rapidly.

In particular, according to various embodiments of the present invention described below, it is possible to successfully send and receive handover related messages through efficient radio resource allocation in the presence of severe inter-cell interference like an environment where small cells are densely deployed.

To this end, in one embodiment, resources used for transmission and reception of handover related messages are allocated on the basis of a coordinated silencing technique. Coordinated silencing is described later.

The description of the present invention may be given as follows.

(a) Overview of handover procedure proposed in embodiments of the present invention
<a1> Description of silencing
<a2> Handover procedure using silencing
(b) Selection of silencing resources
<b1> Static and semi-static schemes for silencing resource selection
<b2> Dynamic schemes for silencing resource selection
(c) Silencing Hereinafter, embodiments of the present invention are described in detail according to the items listed above.

(a) Overview of Handover Procedure Proposed in Embodiments of the Present Invention
<a1> Description of Silencing Silencing in downlink transmission and reception may indicate that, when an ENB sends a desired signal to a UE, neighbor ENBs causing interference do not perform downlink transmission.

Similarly, silencing in uplink transmission and reception may indicate that, when a UE sends a desired signal to an ENB, neighbor ENBs do not perform uplink resource scheduling for different UEs so that the different UEs do not perform uplink transmission.

As described before, handover related messages, i.e. a handover command message and handover confirm message, are sent and received through radio resources.

FIG. 5 illustrates situations where silencing is applied when handover related messages are sent and received.

Part (a) of FIG. 5 illustrates a case of silencing when both source ENB A and target ENB B are a macro ENB. As shown, when source ENB A sends a handover command message to the UE, if target ENB B performs silencing at the resource used to transmit the handover command message, it is possible to increase the probability that the UE successfully receives the handover command message.

Part (b) of FIG. 5 illustrates a case where source ENB A performs silencing when both source ENB A and target ENB B are a macro ENB. As shown, when the UE sends a handover confirm message to target ENB B, if source ENB A performs silencing at the resource used to transmit the handover confirm message, it is possible to increase the probability that target ENB B successfully receives the handover confirm message.

Part (c) of FIG. 5 illustrates a case of silencing when source ENB A is a macro ENB and target ENB B is a small ENB. As shown, when the UE sends a handover confirm message to target ENB B, if source ENB A performs silencing at the resource used to transmit the handover confirm message, it is possible to increase the probability that target ENB B successfully receives the handover confirm message.

In general, handover tends to occur when the downlink signal strength of the target ENB is higher than that of the source ENB. Hence, if the target ENB performs silencing when the source ENB sends a handover command message to the UE, as the strongest interference to the UE is removed, it is possible to increase the possibility that the UE successfully receives a handover related message.

In addition, if the source ENB performs silencing when the UE sends a handover confirm message to the target ENB, the target ENB may receive the handover confirm message in a reduced interference state. Particularly, in a heterogeneous network, as the coverage of the source ENB may be different from that of the target ENB and a hierarchical cell structure is used, interference caused by the source ENB may be significant.

Consequently, silencing may also be useful when the UE sends a handover confirm message.

In the above description, only the source ENB and the target ENB are present. However, in a typical situation, multiple cells may cause interference in transmission and reception of handover related messages.

As such, the case where multiple cells cause interference is also considered in the present invention.

<a2> Handover Procedure Using Silencing

Figure 6:
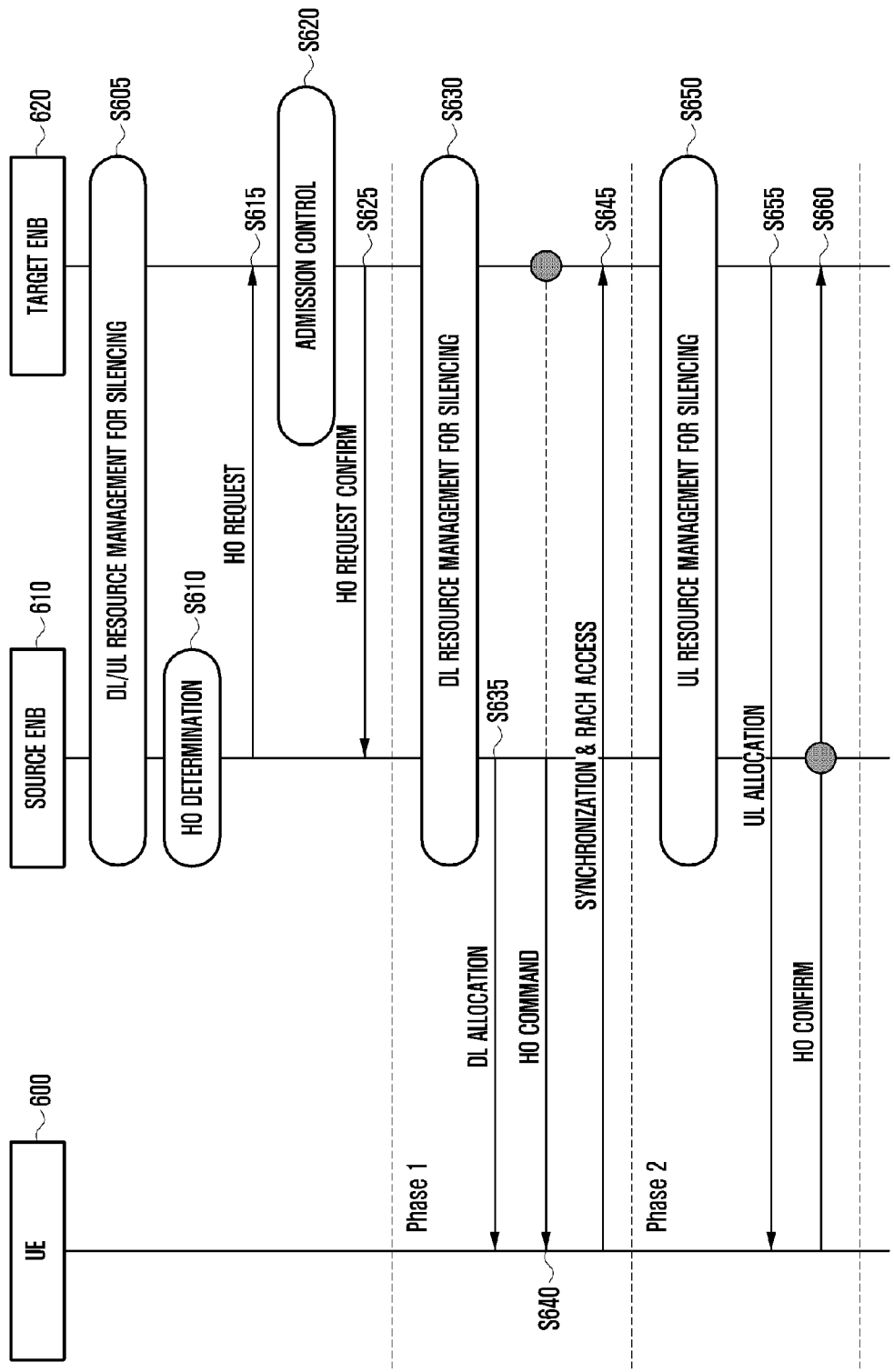
FIG. 6 is a sequence diagram illustrating a handover procedure based on silencing according to an embodiment of the present invention.

FIG. 6 is a sequence diagram illustrating a handover procedure based on silencing according to an embodiment of the present invention.

Among operations of the present invention depicted in FIG. 6, handover determination of the source ENB, admission control of the target ENB, transmission and reception of a handover request message and handover request confirm message are similar to corresponding operations of a general handover procedure.

However, a portion of information contained in the handover request message and handover request confirm message may be different from that of a general case, and the difference will be described in more detail in the corresponding section.

Referring to FIG. 6, at step S605, the source ENB 610 and the target ENB 620 selects a resource to which silencing is to be applied before the source ENB 610 allocates a downlink resource for transmitting a handover command message to the UE 600. This step may be referred to as downlink/uplink resource management for silencing.

Selection of a resource to which silencing is to be applied may be performed in a static manner, in a semi-static manner, or in a dynamic manner, and this will be described in more detail later.

At step S610, the source ENB 610 determines to handover the UE 600. At step S615, the source ENB 610 sends a handover request message to the target ENB 620.

At step S620, the target ENB 620 performs admission control to determine whether to accept the handover request. At step S625, the target ENB 620 sends a handover request confirm message to the source ENB 610.

At step S630, the source ENB 610 and the target ENB 620 perform downlink resource management for silencing. If downlink resource management for silencing is already performed at step S605, step S630 may be skipped.

At step S635, the source ENB 610 sends downlink resource allocation information to the UE 600. At step S640, the source ENB 610 sends a handover command message to the UE 600. At this time, according to one embodiment, the target ENB 620 performs silencing at the resource used to transmit the handover command message so that the above resource is not allocated to another UE. This silencing operation of the target ENB 620 may increase the probability that the UE 600 successfully receives the handover command message from the source ENB 610.

Upon reception of the handover command message, at step S645, the UE 600 performs the synchronization and RACH procedure with the target ENB 620 on the basis of the handover command message.

At step S650, the target ENB 620 performs uplink resource management for silencing. If uplink resource management for silencing is already performed, step S650 may be skipped.

At step S655, the target ENB 620 sends uplink resource allocation information to the UE 600. At step S660, the UE 600 sends a handover confirm message to the target ENB 620 on the basis of the uplink resource allocation information. At this time, according to one embodiment, the source ENB 610 performs silencing so that the corresponding resource is not allocated to another UE. This silencing operation of the source ENB 610 may increase the probability that the target ENB 620 successfully receives the handover confirm message from the UE 600.

Such silencing operation may be applied not only to the source ENB 610 and the target ENB 620 but also to other neighboring ENBs.

Next, a description is given of selection of a resource to which silencing is to be applied.

(b) Selection of Silencing Resources

In various embodiments of the present invention, silencing resource selection schemes may be grouped into two types. The first type is static and/or semi-static, and the second type is dynamic.

In a static and/or semi-static scheme for silencing resource selection, source and target ENBs and other neighbor ENBs determine one or more resources to which silencing is to be applied for handover related messages in advance. Thereafter, when handover occurs, the ENBs exchange an indication message with each other and perform silencing at the corresponding resource.

In a dynamic scheme for silencing resource selection, unlike a static and/or semi-static scheme, the resource to which silencing is to be applied is not determined in advance. In a dynamic scheme, when handover occurs, source and target ENBs and other neighbor ENBs determine a resource to which silencing is to be applied by exchanging request and response messages, and then perform silencing at the determined resource.

Next, silencing resource selection schemes are described in more detail.

<b1> Static and Semi-Static Schemes for Silencing Resource Selection

Figure 7:
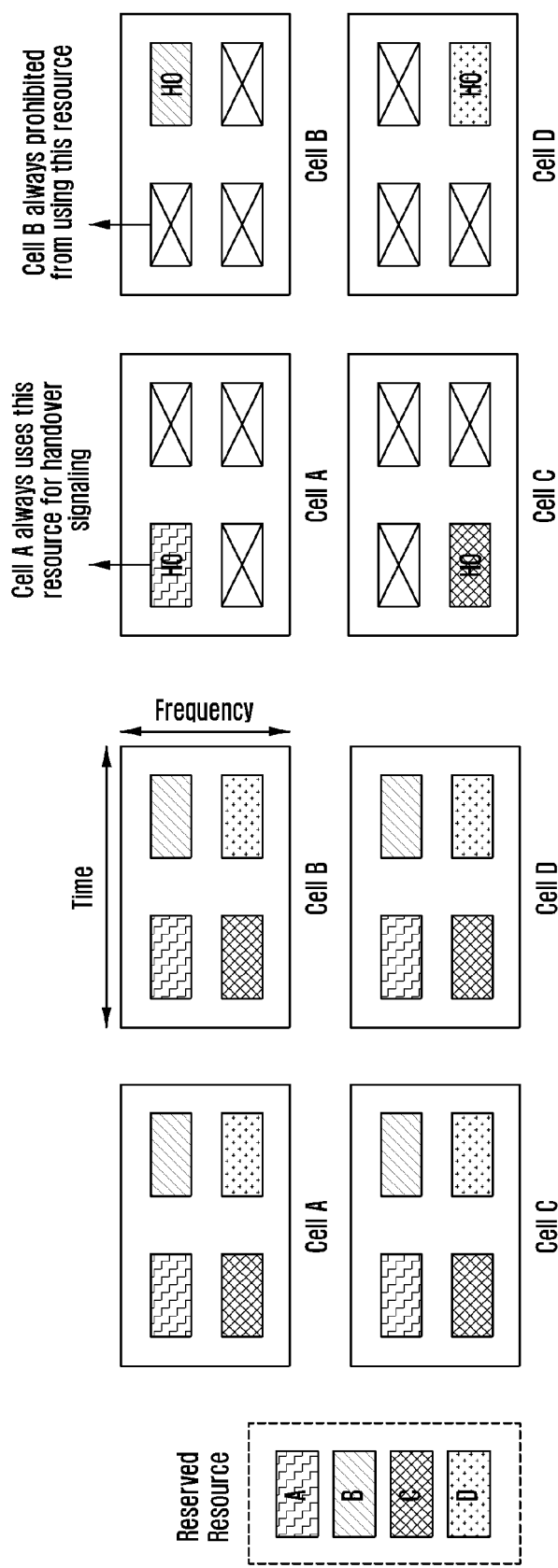
FIG. 7 illustrates static or semi-static selection of silencing resources when handover occurs in base stations A, B, C and D according to an embodiment of the present invention.

FIG. 7 illustrates static or semi-static selection of silencing resources when handover occurs in ENBs A, B, C and D according to an embodiment of the present invention.

Each ENB A, B, C or D may reserve one or more resources for the purpose of handover signaling (e.g. transmission or reception of a handover related message) when handover occurs in the corresponding cell. Here, the number of resources reserved by each ENB may vary according to the number of users in and load of the corresponding cell.

Each ENB shares information on reserved resources with another ENB so that the neighboring ENBs can identify the resources reserved by each other.

In FIG. 7, the resources reserved by different ENBs are hatched with different patterns for distinction.

In a static scheme for silencing resource selection, for sending and receiving a handover related message, each ENB uses a resource reserved by itself only and does not use a resource reserved by another ENB. Hence, although one cell does not perform handover signaling, a resource reserved by the cell is not used by another cell.

In such a static scheme for silencing resource selection, after completion of resource reservation, it is possible for ENBs to apply silencing without exchanging an indication message for handover signaling.

Figure 8:
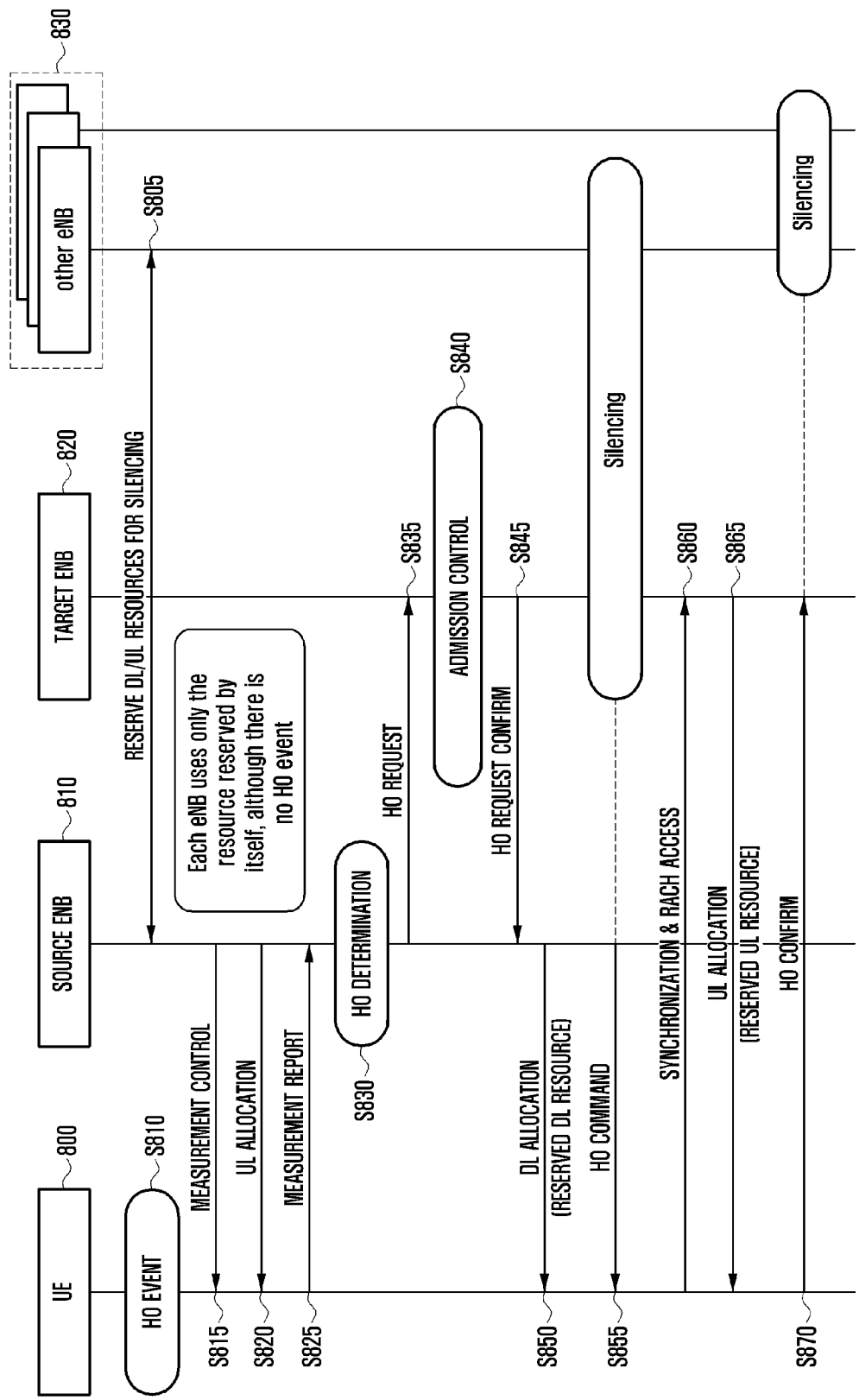
FIG. 8 is a sequence diagram illustrating a handover procedure using static silencing resource selection according to an embodiment of the present invention.

FIG. 8 is a sequence diagram illustrating a handover procedure using static silencing resource selection according to an embodiment of the present invention.

Referring to FIG. 8, at step S805, the source ENB 810 and neighbor ENBs 830 including the target ENB 820 reserve their resources to which silencing is to be applied. In the present embodiment, for handover signaling, one ENB uses only a resource reserved by itself and the other ENBs do not schedule the reserved resource for UEs.

Table 1 illustrates information elements contained in a message for reserving a resource to which silencing is to be applied. The contents of Table 1 may be commonly applied to all embodiments described later.

TABLE 1

| Silencing resource reservation message | |
|---|---|
| BS ID | Identifier of base station sending this message |
| For i = 1:N_DL { | To send handover command message, reserve N_DL downlink resources |
| DL time-frequency resource block | Position of downlink resource being reserved |
| Reservation duration | Valid duration of reserved downlink resource (optional) |
| } | |
| For i = 1:N_UL { | To send handover confirm message, reserve N_UL uplink resources |
| UL time-frequency resource block | Position of uplink resource being reserved |
| Reservation duration | Valid duration of reserved uplink resource (optional) |
| } | |

Here, the amount of resources reserved by one ENB may be determined as follows. First, the ENB reserves a fixed number of downlink resources and uplink resources for handover signaling at the time of deployment.

Next, during operation, the ENB collects statistical information regarding (i) the number of users in the cell, (ii) the amount of reserved downlink resources, (iii) the amount of reserved uplink resources, (iv) the failure rate of transmission and reception of handover command messages through the downlink, and (v) the failure rate of transmission and reception of handover confirm messages through the uplink. On the basis of the collected information, the ENB derives the failure rate of transmission and reception of handover command messages according to the amount of reserved downlink resources/the number of users, and the failure rate of transmission and reception of handover confirm messages according to the amount of reserved uplink resources/the number of users.

Finally, the ENB sets a target for the failure rate of transmission and reception of handover command messages and sets a target for the failure rate of transmission and reception of handover confirm messages. Thereafter, the ENB changes the amount of reserved downlink resources and the amount of reserved uplink resources according to a variation of the number of users in the cell so that the two targets are achieved.

This heuristic approach may become more effective as the amount of statistical information collected by each ENB increases.

Referring back to FIG. 8, at step S810, the UE 800 detects a handover event.

At step S815, the source ENB 810 sends measurement control information to the UE 800. At step S820, the source ENB 810 allocates uplink resources for measurement reporting.

At step S825, the UE 800 sends the source ENB 810 a measurement report message containing results of measurement on at least one of the source ENB 810 and the target ENB 820.

At step S830, the source ENB 810 may determine to handover the UE 800. Upon determining to handover, at step S835, the source ENB 810 sends a handover request message to the target ENB 820.

At step S840, the target ENB 820 performs admission control to determine whether to accept the handover request. At step S845, the target ENB 820 sends a handover request confirm message to the source ENB 810.

At step S850, the source ENB 810 sends the UE 800 downlink resource allocation information, which may include information on a resource reserved by the source ENB 810 for transmission of a handover related message (handover command message, in particular).

At step S855, the source ENB 855 sends a handover command message to the UE 800 in consideration of the downlink resource allocation information. At this time, according to one embodiment, the target ENB 820 and the neighbor ENBs 830 perform silencing always at the resource used to transmit the handover command message so that the above resource is not allocated to another UE.

These silencing operations of the target ENB 620 and the neighbor ENBs 830 may increase the probability that the UE 800 successfully receives the handover command message from the source ENB 810.

Upon reception of the handover command message, at step S860, the UE 800 performs the synchronization and RACH procedure with the target ENB 820 on the basis of the handover command message.

At step S865, the target ENB 820 sends the UE 800 uplink resource allocation information, which may include information on a resource to be used for transmission of a handover confirm message.

At step S870, the UE 800 sends a handover confirm message to the target ENB 820 on the basis of the uplink resource allocation information. At this time, according to one embodiment, the source ENB 810 and the neighbor ENBs 830 perform silencing always at the corresponding resource so that the corresponding resource is not allocated to another UE.

These silencing operations may increase the probability that the target ENB 820 successfully receives the handover confirm message from the UE 800.

Next, a description is given of semi-static selection of silencing resources according to an embodiment of the present invention.

Figure 9:
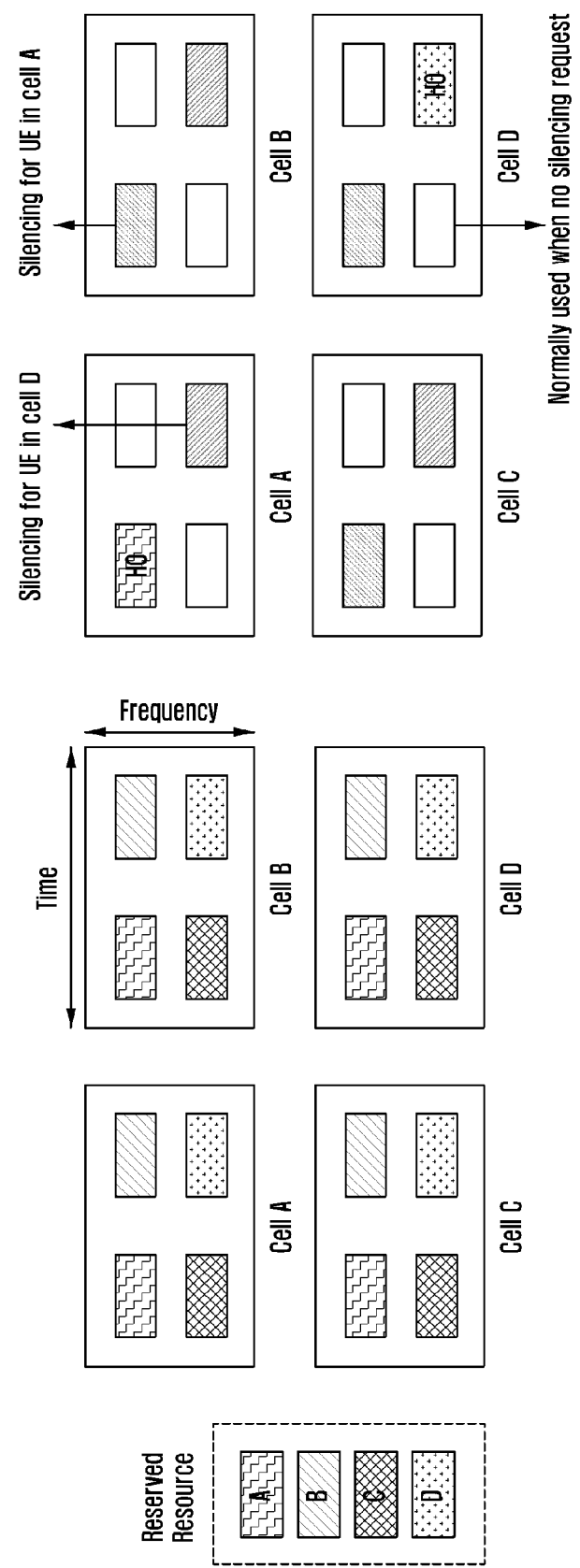
FIG. 9 illustrates semi-static silencing resource selection according to an embodiment of the present invention.

FIG. 9 illustrates semi-static silencing resource selection according to an embodiment of the present invention.

In semi-static silencing resource selection, each ENB reserves resources to be used for transmission and reception of handover related messages in a manner similar to the case of static silencing resource selection. However, while neighbor ENBs always perform silencing at the reserved resources in static selection, each ENB may use the reserved resources for transmission and reception of regular data unless an indication message is received from another ENB in semi-static selection.

In semi-static silencing resource selection, when handover occurs after resource reservation, an indication message indicating handover signaling may be exchanged. When some ENBs receive an indication message from a particular ENB, they perform silencing at the resource reserved by the ENB having sent the indication message.

This is described in more detail with reference to FIG. 10.

Figure 10:
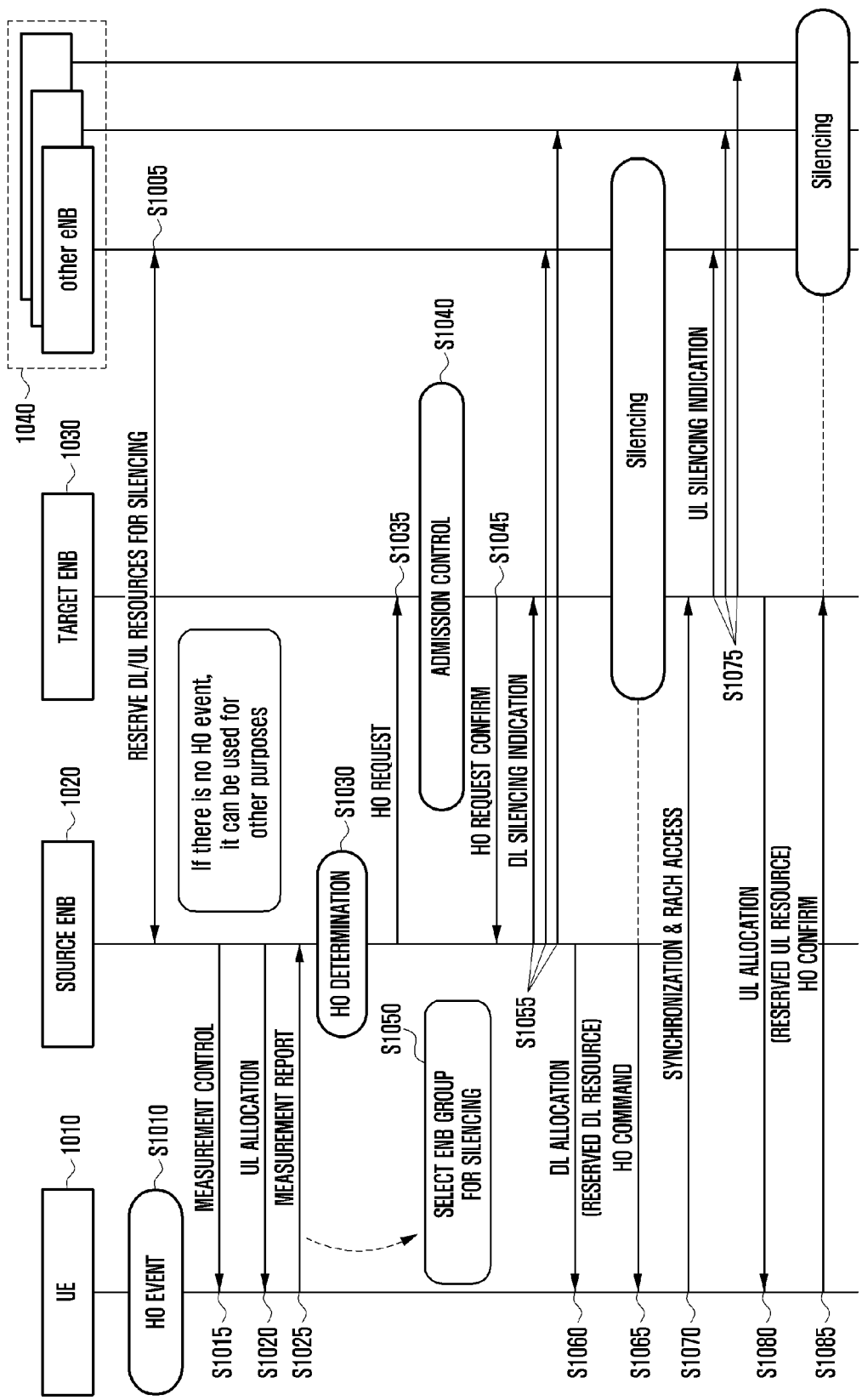
FIG. 10 is a sequence diagram illustrating semi-static silencing resource selection according to an embodiment of the present invention.

FIG. 10 is a sequence diagram illustrating semi-static silencing resource selection according to an embodiment of the present invention.

Referring to FIG. 10, at step S1005, the source ENB 1020 and neighbor ENBs 1040 including the target ENB 1030 reserve their resources to which silencing is to be applied. In the present embodiment, each ENB may use only the reserved resources for handover signaling; and the other ENBs may use the reserved resources in the absence of an indication message and perform, when an indication message is received, silencing at the resource reserved by the ENB having sent the indication message.

At step S1010, the UE 1010 detects a handover event.

At step S1015, the source ENB 1020 sends measurement control information to the UE 1010. At step S1020, the source ENB 1020 allocates uplink resources for measurement reporting.

At step S1025, the UE 1010 sends the source ENB 1020 a measurement report message containing results of measurement on at least one of the source ENB 1020 and the target ENB 1030.

At step S1030, the source ENB 1020 may determine to handover the UE 1010. Upon determining to handover, at step S1035, the source ENB 1020 sends a handover request message to the target ENB 1030.

At step S1040, the target ENB 1030 performs admission control to determine whether to accept the handover request. At step S1045, the target ENB 1030 sends a handover request confirm message to the source ENB 1020.

At step S1055, in the present embodiment, the source ENB 1020 sends an indication message (specifically, downlink silencing indication message) to the target ENB 1030 and the neighbor ENBs 1040. The downlink silencing indication message is sent in order to request the neighbor ENBs to perform silencing at the resource reserved by the source ENB 1020 for handover signaling.

Table 2 illustrates information elements contained in a downlink silencing indication message.

TABLE 2

| Downlink silencing indication message | |
| --- | --- |
| DL time-frequency resource block index | Index of resource reserved to send handover command message |
| DL silencing timing | Point in time of transmitting handover command message |

The downlink silencing indication message includes index information of the resource reserved to send a handover command message. As individual ENBs share detailed information regarding time-frequency resources for handover signaling through the silencing resource reservation message, the downlink silencing indication message includes index information of the reserved resource only.

At step S1060, the source ENB 1020 sends the UE 1010 downlink resource allocation information, which may include information on a resource reserved by the source ENB 1020 for transmission of a handover related message (handover command message, in particular).

At step S1065, the source ENB 1020 sends a handover command message to the UE 1010 in consideration of the downlink resource allocation information. At this time, according to one embodiment, the target ENB 1030 and the neighbor ENBs 1040 perform silencing at the resource used to transmit the handover command message so that the above resource is not allocated to another UE.

These silencing operations of the target ENB 1030 and the neighbor ENBs 1040 may increase the probability that the UE 1010 successfully receives the handover command message from the source ENB 1020.

Upon reception of the handover command message, at step S1070, the UE 1010 performs the synchronization and RACH procedure with the target ENB 1030 on the basis of the handover command message.

Thereafter, at step S1075, in the present embodiment, the target ENB 1030 may send an indication message (specifically, uplink silencing indication message) to the neighbor ENBs 1040. The uplink silencing indication message may be sent in order to request the neighbor ENBs to perform silencing at the resource reserved by the target ENB 1030 for handover signaling.

Table 3 illustrates information elements contained in an uplink silencing indication message.

TABLE 3

| Uplink silencing indication message | |
| --- | --- |
| UL time-frequency resource block index | Index of resource reserved to send handover confirm message |
| UL silencing timing offset | Point in time of transmitting handover confirm message |

The uplink silencing indication message includes index information of the resource reserved to send a handover confirm message. As individual ENBs share detailed information regarding time-frequency resources for handover signaling through the silencing resource reservation message, the uplink silencing indication message includes index information of the reserved resource only.

At step S1080, the target ENB 1030 sends the UE 1010 uplink resource allocation information, which may include information on a resource to be used for transmission of a handover confirm message.

At step S1085, the UE 1010 sends a handover confirm message to the target ENB 1030 on the basis of the uplink resource allocation information.

At this time, the neighbor ENBs 1040 perform silencing at the resource used to send the handover confirm message, increasing the probability that the target ENB 1030 successfully receives the handover confirm message from the UE 1010.

<b2> Dynamic Schemes for Silencing Resource Selection

Next, a description is given of dynamic selection of silencing resources according to an embodiment of the present invention.

In dynamic silencing resource selection, unlike static/semi-static silencing resource selection described above, the resource to which silencing is to be applied is not determined in advance. In dynamic silencing resource selection, when handover occurs, the source ENB, target ENB and neighbor ENBs select the resource to which silencing is to be applied for handover signaling by exchanging a request message and/or a response message.

Dynamic silencing resource selection may obviate the overhead of static/semi-static silencing resource selection. That is, it is not required to determine the collection of ENBs to perform silencing and the amount of resources to be reserved in advance before handover occurrences. In dynamic silencing resource selection, it is possible to change the collection of ENBs to perform silencing according to interference states and to change the amount of resources to which silencing is to be applied according to the number of UEs being handed over.

For handover, the ENBs closest to a UE are the source ENB and target ENB. Hence, the source ENB and the target ENB may cause significant interference to each other. If only the source ENB and the target ENB apply silencing, it is possible to utilize existing handover request and handover request ACK (confirm) messages for silencing.

Upon determining that downlink silencing is necessary, the source ENB may send the target ENB a handover request message containing information elements listed in Table 4. Alternatively, the source ENB may send a downlink silencing request message containing information elements listed in Table 4 to a different ENB other than the target ENB.

TABLE 4

| DL silencing request message or DL silencing information included in handover request message | |
|---|---|
| For i = 1:N_DL { | Provide information on N_DL silencing resources for transmitting handover command message |
| DL time-frequency resource block } | Resource used to send handover command message |
| DL silencing timing | Point in time of transmitting handover command message |

Thereafter, when the UE succeeds in RACH access to the target ENB, the target ENB may determine whether to apply uplink silencing.

Upon determining to apply uplink silencing, the target ENB may send an uplink silencing request message to the source ENB. In the case of uplink silencing, to provide information needed for silencing, the target ENB may send an uplink silencing request message to an ENB regardless of whether the ENB is the source ENB or not.

When the source ENB (or neighbor ENB) receives the uplink silencing request message, it does not schedule an uplink UE at the indicated resource and point in time.

Table 5 illustrates information elements included in an uplink silencing request message.

TABLE 5

| Uplink silencing request message | |
|---|---|
| For i = 1:N_UL { | Provide information on N_UL silencing resources for transmitting handover confirm message |
| UL time-frequency resource block } | Resource used to transmit handover confirm message |
| UL silencing timing | Point in time of transmitting handover confirm message |

The downlink silencing request message and the uplink silencing request message described above include information on N_DL resources and N_UL resources, respectively. If N_DL or N_UL is equal to 1, this indicates that one resource to which silencing is to be applied is determined already. Hence, one or more ENBs having received the silencing request message may perform silencing at the indicated resource.

When one ENB receives a silencing request message whose N_DL or N_UL is greater than or equal to 2, the ENB having received the silencing request message selects a suitable resource, notifies the ENB having sent the silencing request message of the selection result, and performs silencing at the selected resource.

When two or more ENBs receive a silencing request message whose N_DL or N_UL is greater than or equal to 2, each of the two or more ENBs selects a suitable resource and notifies the ENB having sent the silencing request message of the selection result. The ENB having sent the silencing request message pieces together responses from the multiple ENBs to select the most suitable resource and notifies the neighbor ENBs of the selection result so that silencing is performed at the most suitable resource.

Figure 11:
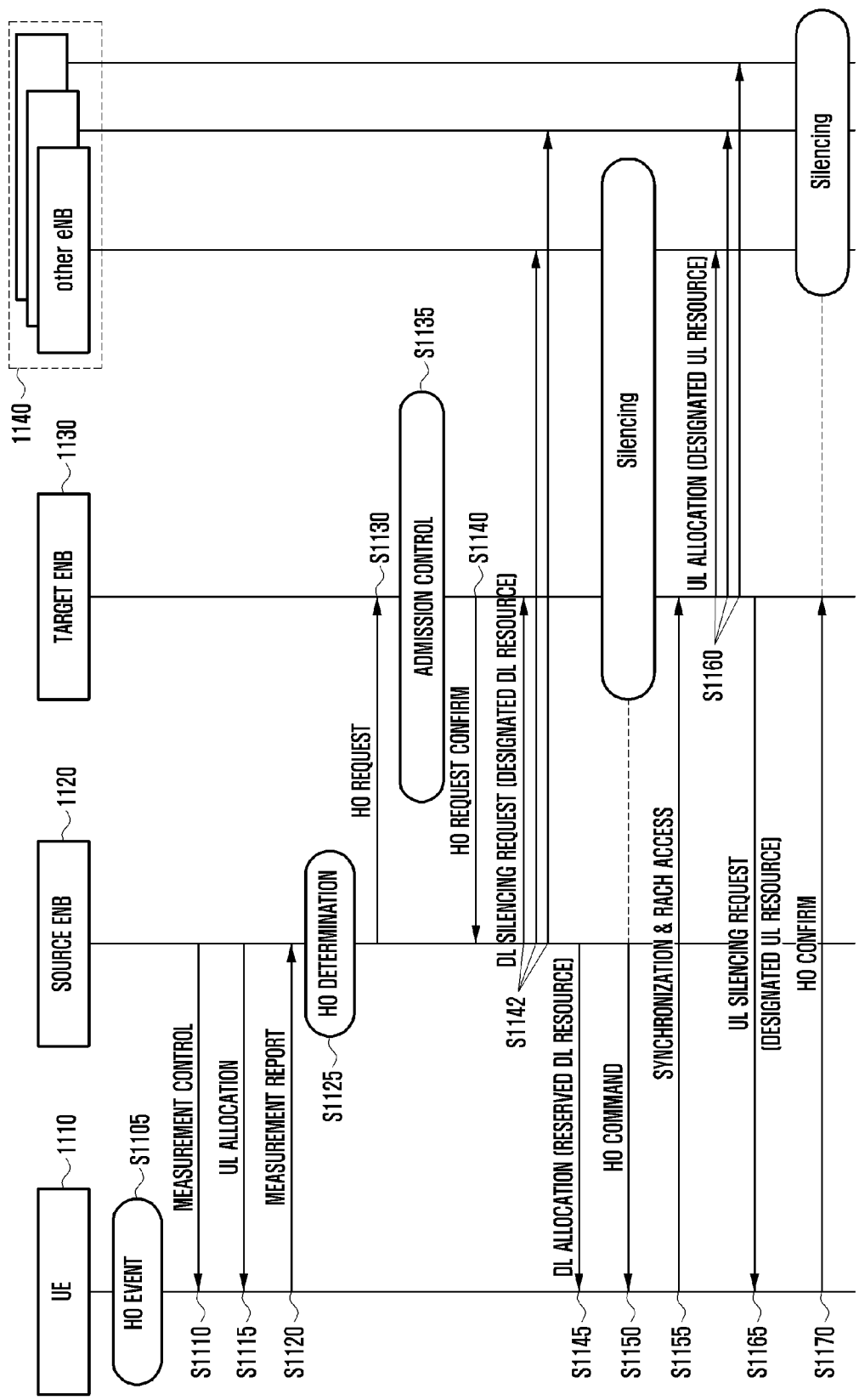
FIG. 11 is a sequence diagram illustrating a handover procedure based on dynamic silencing according to an embodiment of the present invention.

FIG. 11 is a sequence diagram illustrating a handover procedure based on dynamic silencing according to an embodiment of the present invention.

Specifically, FIG. 11 depicts a handover procedure in the case where the resource to which silencing is to be applied is determined in advance.

At step S1105, the UE 1110 detects a handover event.

At step S1110, the source ENB 1120 sends measurement control information to the UE 1110. At step S1115, the source ENB 1120 allocates uplink resources for measurement reporting.

At step S1120, the UE 1110 sends the source ENB 1120 a measurement report message containing results of measurement on at least one of the source ENB 1120 and the target ENB 1130.

At step S1125, the source ENB 1120 may determine to handover the UE 1110. Upon determining to handover, at step S1130, the source ENB 1120 sends a handover request message to the target ENB 1130.

At step S1135, the target ENB 1130 performs admission control to determine whether to accept the handover request. At step S1140, the target ENB 1130 sends a handover request confirm message to the source ENB 1120.

At step S1142, in the present embodiment, the source ENB 1120 sends a downlink silencing request message to the target ENB 1130 and the neighbor ENBs 1140. The downlink silencing request message may include information on the resource to which silencing is to be applied.

At step S1145, the source ENB 1120 sends the UE 1110 downlink resource allocation information, which may include information on a resource to be used for transmission of a handover related message (handover command message, in particular).

At step S1150, the source ENB 1120 sends a handover command message to the UE 1110 in consideration of the downlink resource allocation information. At this time, in the present embodiment, according to the silencing request from the source ENB 1120, the target ENB 1130 and the neighbor ENBs 1140 perform silencing at the resource used to transmit the handover command message so that the above resource is not allocated to another UE.

These silencing operations of the target ENB 1130 and the neighbor ENBs 1140 may increase the probability that the UE 1110 successfully receives the handover command message from the source ENB 1120.

Upon reception of the handover command message, at step S1155, the UE 1110 performs the synchronization and RACH procedure with the target ENB 1130 on the basis of the handover command message.

Thereafter, at step S1160, in the present embodiment, the target ENB 1130 may send an uplink silencing request message to the neighbor ENBs 1140. The uplink silencing request message may include information on the resource to which silencing is to be applied.

At step S1165, the target ENB 1130 sends the UE 1110 uplink resource allocation information, which may include information on an uplink resource allocated for transmission of a handover confirm message.

At step S1170, the UE 1110 sends a handover confirm message to the target ENB 1130 on the basis of the uplink resource allocation information.

At this time, the neighbor ENBs 1140 perform silencing at the resource used to send the handover confirm message, increasing the probability that the target ENB 1130 successfully receives the handover confirm message from the UE 1110.

Figure 12:
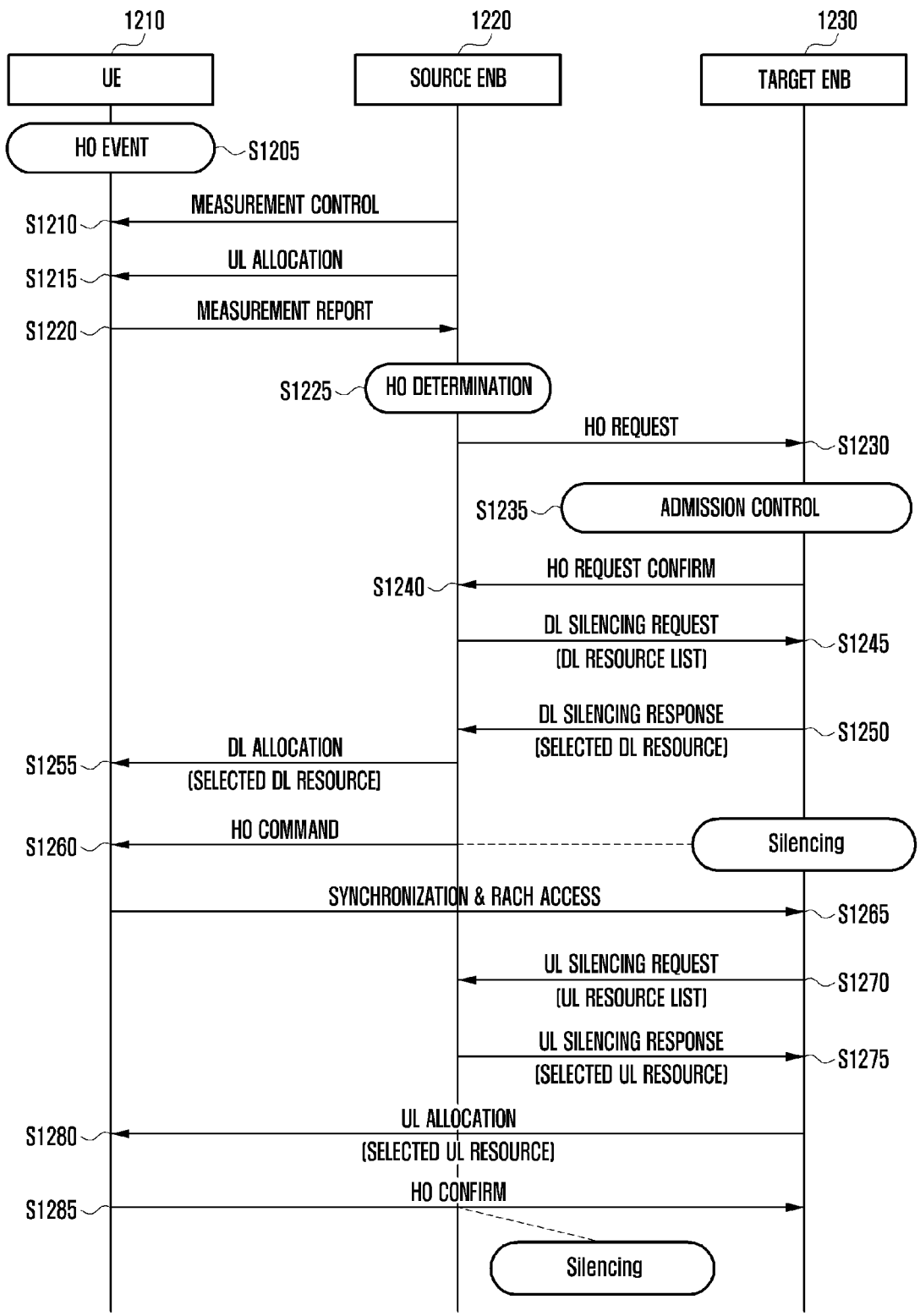
FIG. 12 is a sequence diagram illustrating a handover procedure based on dynamic silencing according to an embodiment of the present invention.

FIG. 12 is a sequence diagram illustrating a handover procedure based on dynamic silencing according to an embodiment of the present invention.

Specifically, FIG. 12 depicts a handover procedure in the case where negotiations are made about the resource to which silencing is to be applied.

At step S1205, the UE 1210 detects a handover event.

At step S1210, the source ENB 1220 sends measurement control information to the UE 1210. At step S1215, the source ENB 1220 allocates uplink resources for measurement reporting.

At step S1220, the UE 1210 sends the source ENB 1220 a measurement report message containing results of measurement on at least one of the source ENB 1220 and the target ENB 1230.

At step S1225, the source ENB 1220 may determine to handover the UE 1210. Upon determining to handover, at step S1230, the source ENB 1220 sends a handover request message to the target ENB 1230.

At step S1235, the target ENB 1230 performs admission control to determine whether to accept the handover request. At step S1240, the target ENB 1230 sends a handover request confirm message to the source ENB 1220.

At step S1245, in the present embodiment, the source ENB 1220 sends a downlink silencing request message to the target ENB 1230. The downlink silencing request message may include information on a list of resources to which silencing is applicable.

Thereafter, the target ENB 1230 selects a resource to which silencing is to be applied on the basis of the received information on the list of resources to which silencing is applicable. At step S1250, the target ENB 1230 sends the source ENB 1220 a downlink silencing response message containing information on the selected resource.

At step S1255, the source ENB 1220 sends the UE 1210 downlink resource allocation information, which may include information on the resource selected by the target ENB 1230 for silencing.

At step S1260, the source ENB 1220 sends a handover command message to the UE 1210 via the selected resource. At this time, the target ENB 1230 performs silencing at the selected resource.

These silencing operation of the target ENB 1230 may increase the probability that the UE 1210 successfully receives the handover command message from the source ENB 1220.

Upon reception of the handover command message, at step S1265, the UE 1210 performs the synchronization and RACH procedure with the target ENB 1230 on the basis of the handover command message.

Thereafter, at step S1270, the target ENB 1230 may send an uplink silencing request message to the source ENB 1220. The uplink silencing request message may include information on a list of resources to which silencing is applicable.

The source ENB 1220 selects a resource to which silencing is to be applied on the basis of the received information on the list of resources to which silencing is applicable. At step S1275, the source ENB 1220 sends the target ENB 1230 an uplink silencing response message containing information on the selected resource.

At step S1280, the target ENB 1230 sends the UE 1210 uplink resource allocation information, which may include information on the resource selected by the source ENB 1220 for silencing.

At step S1285, the UE 1210 sends a handover confirm message to the target ENB 1230 on the basis of the uplink resource allocation information.

Figure 13:
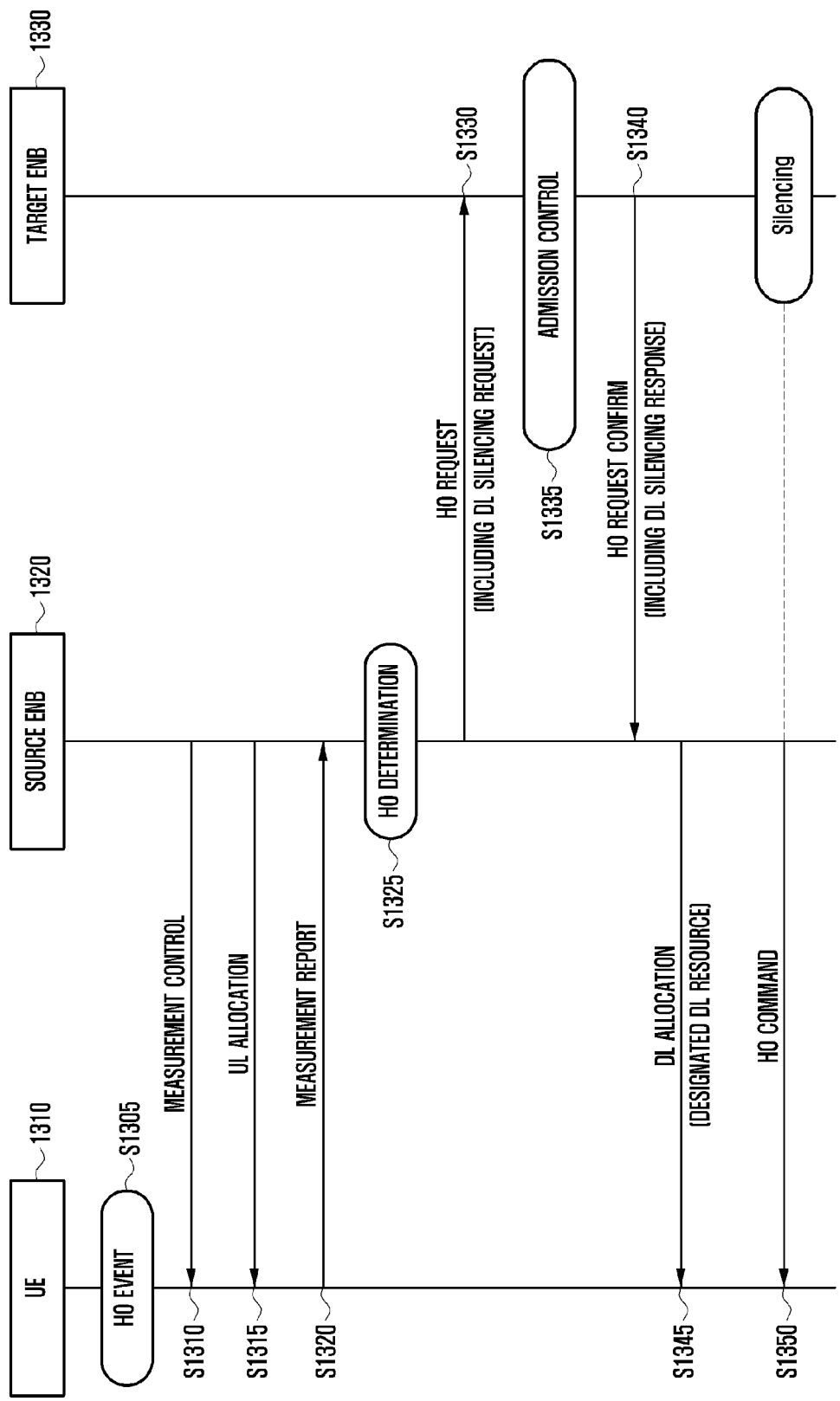
FIG. 13 is a sequence diagram illustrating a handover procedure based on dynamic silencing according to an embodiment of the present invention.

FIG. 13 is a sequence diagram illustrating a handover procedure based on dynamic silencing according to an embodiment of the present invention.

Specifically, FIG. 13 depicts a handover procedure in the case where only the target ENB performs silencing.

At step S1305, the UE 1310 detects a handover event.

At step S1310, the source ENB 1320 sends measurement control information to the UE 1310. At step S1315, the source ENB 1320 allocates uplink resources for measurement reporting.

At step S1320, the UE 1310 sends the source ENB 1320 a measurement report message containing results of measurement on at least one of the source ENB 1320 and the target ENB 1330.

At step S1325, the source ENB 1320 may determine to handover the UE 1310. Upon determining to handover, at step S1330, the source ENB 1320 sends a handover request message to the target ENB 1330. In the present embodiment, as only the target ENB 1330 performs silencing, the handover request message may further include information for a downlink silencing request.

At step S1335, the target ENB 1330 performs admission control to determine whether to accept the handover request. At step S1340, the target ENB 1330 sends a handover request confirm message to the source ENB 1320. In the present embodiment, the handover request confirm message may further include information for a downlink silencing response.

At step S1345, the source ENB 1320 sends the UE 1310 downlink resource allocation information, which may include information on a pre-determined resource to be used for transmitting a handover related message (handover command message, in particular).

At step S1350, the source ENB 1320 sends a handover command message to the UE 1310 in consideration of the downlink resource allocation information. At this time, in the present embodiment, the target ENB 1330 performs silencing at the resource used to send the handover command message.

As described before, in dynamic silencing resource selection, the source ENB or the target ENB may select a resource to which silencing is to be applied.

Each of the source ENB and the target ENB may identify channel gains for only UEs attached to itself. Hence, when the source ENB performs silencing resource selection, the source ENB may select the most advantageous resource (i.e. the resource maximizing the channel gain between the source ENB and the UE to be handed over) and request the target ENB to perform silencing at the selected resource.

On the other hand, the target ENB does not know the channel gain for the UE to be handed over. Hence, for the UE to be handed over, the target ENB may perform silencing at a resource causing the least disadvantage (i.e. a resource remaining after resources producing a good channel gain are allocated first to UEs attached to the target ENB).

The handover command message is sent from the source ENB to the UE regardless of the silencing resource selection scheme used by the target ENB. However, if the target ENB performs silencing resource selection as described above, although it is not possible to identify the channel gain between the source ENB and the UE at the selected resource, it is evident that the selected resource causes the least disadvantage to the target ENB.

Consequently, silencing resource selection performed by the target ENB may result in an advantage for the overall network.

(c) Operation for Failure of Silencing Resource Selection

It is not possible to change the transmitting node when the UE sends a handover confirm message to the target ENB. That is, the UE has to send the handover confirm message.

On the other hand, it is possible to change the transmitting node when the source ENB sends a handover command message to the UE by use of the backhaul between ENBs.

Silencing is performed to alleviate interference caused by a neighbor ENB. When the neighbor ENB does not have extra resources for silencing, it cannot perform silencing for the UE to be handed over and may cause significant interference to the UE to be handed over.

In such a case, it is possible to carry out handover without use of silencing like an existing handover procedure.

Second, when the source cell is a small cell, it is possible to make a request to a macro cell to send a handover command message. This is described in detail with reference to FIG. 14.

Figure 14:
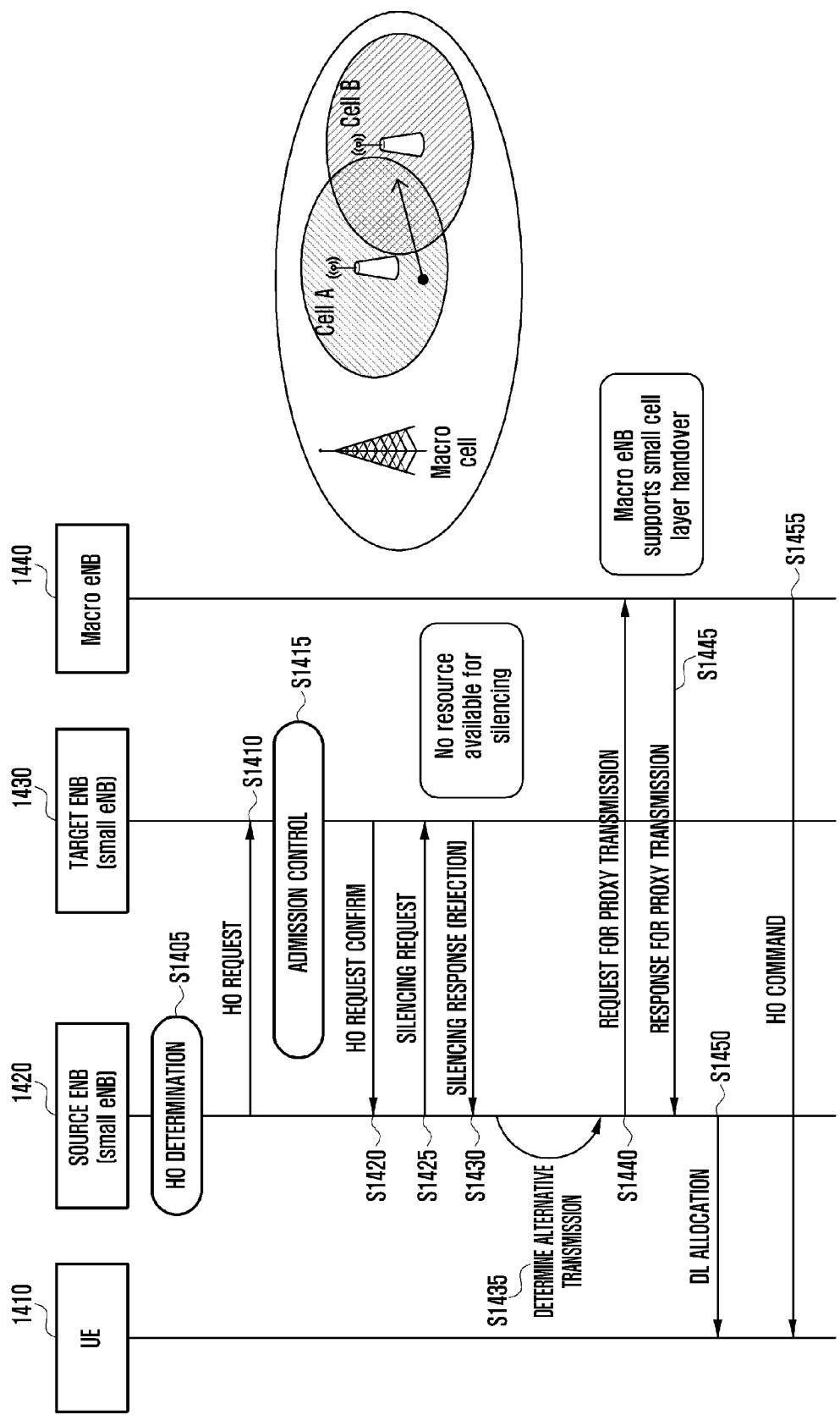
FIG. 14 is a sequence diagram illustrating a procedure to transmit a handover command message by a macro cell instead of a small cell according to an embodiment of the present invention.

FIG. 14 is a sequence diagram illustrating a procedure to transmit a handover command message by a macro cell instead of a small cell according to an embodiment of the present invention.

In FIG. 14, it is assumed that the source ENB 1420 and the target ENB 1430 are a small ENB.

At step S1405, the source ENB 1420 determines to handover the UE 1410. At step S1410, the source ENB 1420 sends a handover request message to the target ENB 1430.

At step S1415, the target ENB 1430 performs admission control to determine whether to accept the handover request. At step S1420, the target ENB 1430 sends a handover request confirm message to the source ENB 1420.

At step S1425, the source ENB 1420 sends a silencing request message to the target ENB 1430. Here, it is assumed that the target ENB 1430 has no extra resource for silencing.

At step S1430, the target ENB 1430 sends a response message indicating silencing request rejection to the source ENB 1420.

Upon reception of the response message indicating rejection, at step S1435, the source ENB 1420 determines to use alternative transmission. At step S1440, the source ENB 1420 sends a request message for proxy transmission to the macro ENB 1440. The macro ENB 1440 may be the nearest macro ENB to the serving ENB 1420 being a small cell or be a macro ENB managing the serving ENB 1420.

At step S1445, the macro ENB 1440 sends a response message for proxy transmission to the source ENB 1420. At step S1450, the source ENB 1420 sends the UE 1410 downlink resource allocation information indicating a resource to be used for transmitting a handover command message.

Thereafter, at step S1455, the macro ENB 1440 sends a handover command message to the UE 1410 on the basis of the downlink resource allocation information.

As another embodiment of the present invention, it may be considered that the target ENB sends a handover command message on behalf of the source ENB and the source ENB performs silencing to reduce interference.

As described before, handover may occur when the signal strength of the target ENB is better than that of the source ENB by a preset offset. Hence, if the UE can receive downlink data from the target ENB, it may be considered that the target ENB sends a handover command message to the UE.

Here, when the channel gain between the UE and the source ENB is significantly degraded already, it is preferable for the source ENB to perform silencing. This is because transmission of a handover command message by the source cell does not contribute to an increase in the reception SINR of the UE and causes additional interference to UEs attached to ENBs neighboring the source ENB. This operation is described in more detail with reference to FIG. 15.

Figure 15:
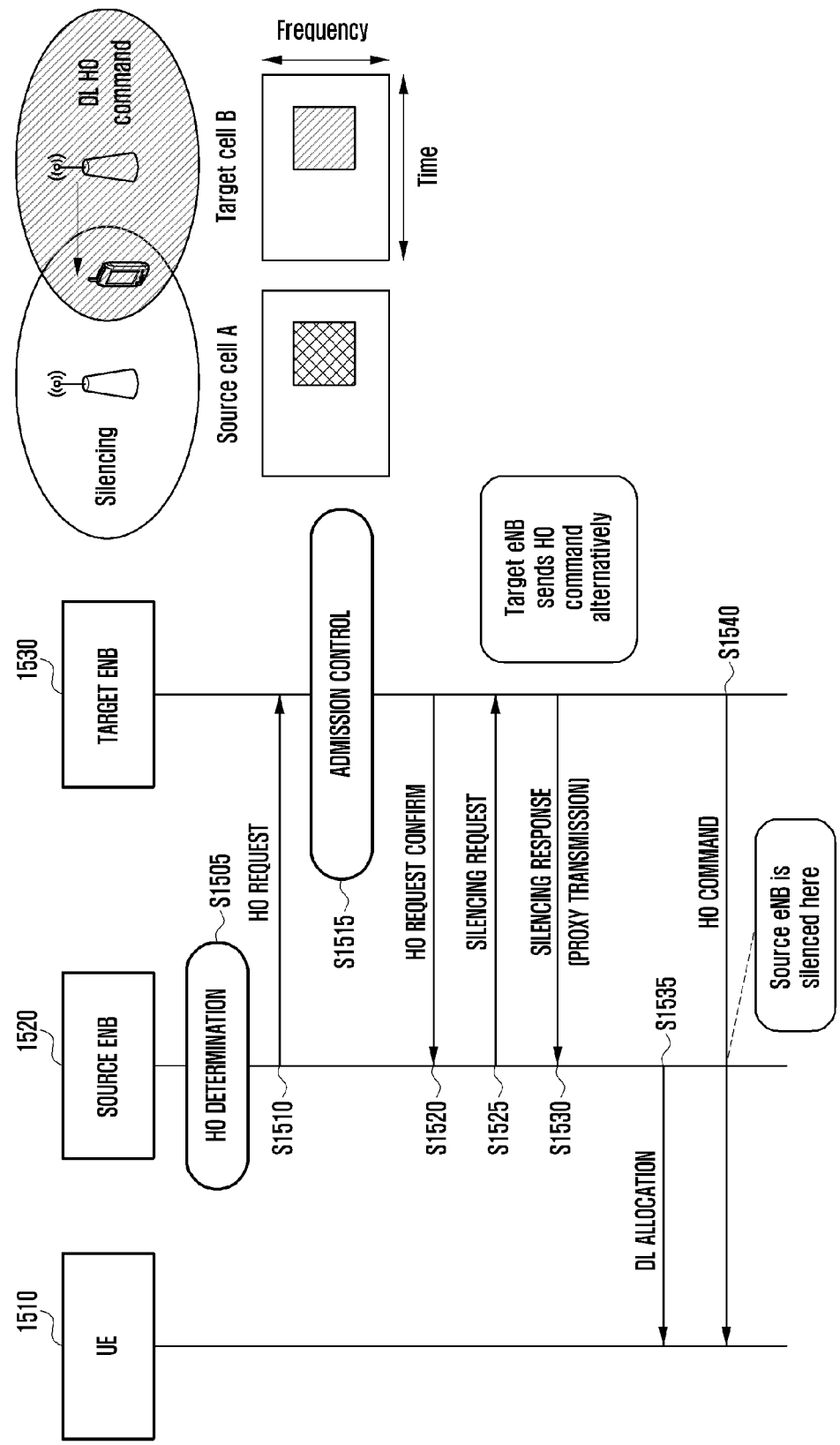
FIG. 15 is a sequence diagram of a procedure to transmit a handover command message according to an embodiment of the present invention.

FIG. 15 is a sequence diagram of a procedure to transmit a handover command message according to an embodiment of the present invention.

At step S1505, the source ENB 1520 determines to handover the UE 1510. At step S1510, the source ENB 1520 sends a handover request message to the target ENB 1530.

At step S1515, the target ENB 1530 performs admission control to determine whether to accept the handover request. At step S1520, the target ENB 1530 sends a handover request confirm message to the source ENB 1520.

At step S1525, the source ENB 1520 sends a silencing request message to the target ENB 1530. In the present embodiment, the silencing request message may include information regarding the position of a resource to which silencing is to be applied and the point in time of transmitting a handover command message.

Upon determining that it is advantageous for the target ENB 1530 to send a handover command message on behalf of the source ENB 1520, at step S1530, the target ENB 1530 sends a silencing response message indicating proxy transmission to the source ENB 1520. At step S1535, the source ENB 1520 sends downlink resource allocation information to the UE 1510.

At step S1540, the target ENB 1530 sends a handover command message to the UE 1510 by use of a resource indicated by the silencing request message and at the indicated point in time. At this time, the source ENB 1520 performs silencing at the indicated resource and point in time.

Here, as the target ENB 1530 has already accepted the handover request through admission control, it may compose a handover command message by itself.

As such, it is possible that the target ENB 1530 sends a handover command message and the source ENB 1520 performs silencing.

Figure 16:
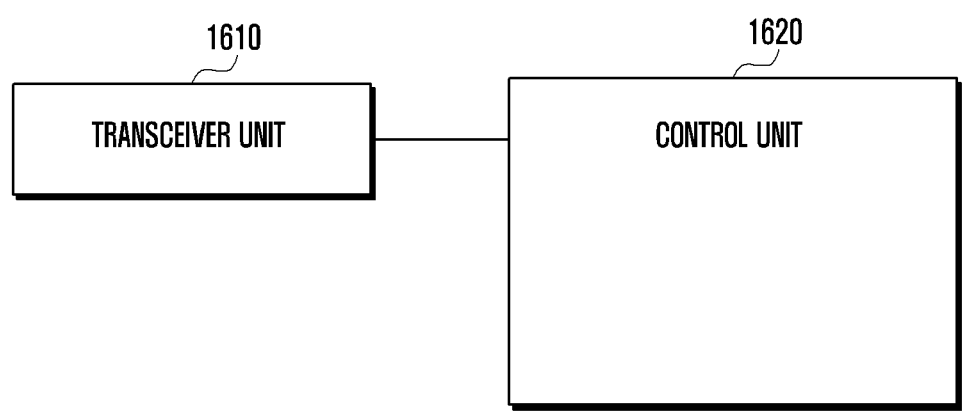
FIG. 16 is a block diagram of a source or target base station according to an embodiment of the present invention.

FIG. 16 is a block diagram of a base station according to an embodiment of the present invention. The base station may act as the source ENB or the target ENB for handover processing. As shown in FIG. 16, the ENB may include a transceiver unit 1610 and a control unit 1620.

The transceiver unit 1610 may send and receive signals to and from a UE, one or more neighbor ENBs, a node of the core network of a wireless communication system.

The operation of the control unit 1620 is described separately for the case where the ENB is a source ENB and for the case where the ENB is a target ENB.

In the case where the ENB is a source ENB, the control unit 1620 may determine silencing resource information so that at least one ENB does not perform downlink or uplink transmission when a handover related message is sent or received for handover processing. The control unit 1620 may determine to handover a UE. The control unit 1620 may control a handover procedure for the UE according to the silencing resource information.

The control unit 1620 may control a process of receiving a handover request confirm message for the UE from the target ENB, and sending a handover command message to the UE. Here, the target ENB may perform silencing when the handover command message is sent to the UE.

The control unit 1620 may control an operation to perform silencing when the UE sends a handover confirm message to the target ENB.

The control unit 1620 may control a process of reserving a resource to be used for sending a handover related message and sharing the reservation information with one or more ENBs. Here, each ENB may separately reserve a resource to be used for sending a handover related message.

In one embodiment, for a resource reserved by one ENB for transmitting a handover related message, another ENB may always perform silencing at the reserved resource.

In another embodiment, the control unit 1620 may control a process of sending a silencing indication message to at least one neighbor ENB and performing handover for the UE according to the resource reservation information. Here, the neighbor ENB having received the silencing indication message may perform silencing at the reserved resource.

The control unit 1620 may control a process of sending the target ENB a downlink silencing request message containing information on a list of resources to which silencing is applicable, receiving a downlink silencing response message containing information on the resource selected for silencing from the target ENB, and sending a handover command message to the UE according to the information on the resource selected for silencing. Here, the target ENB may perform silencing when the source ENB sends the handover command message to the UE.

The control unit 1620 may control a process of receiving an uplink silencing request message containing information on the list of resources to which silencing is applicable from the target ENB, selecting a resource for uplink silencing from the list, sending an uplink silencing response message containing information on the selected resource for uplink silencing to the target ENB, and performing silencing when the UE sends a handover confirm message to the target ENB.

In one embodiment, when the source ENB is a small ENB, the control unit 1620 may control a process of sending a silencing request message to the target ENB, receiving a response message rejecting the silencing request from the target ENB, sending a request message for proxy transmission of a handover command message to a macro ENB connected with the source ENB, and performing silencing when the macro ENB sends a handover command message to the UE.

In another embodiment, the control unit 1620 may control a process of sending a silencing request message to the target ENB, receiving a response message indicating proxy transmission of a handover command message from the target ENB, and performing silencing when the target ENB sends a handover command message to the UE.

In the case where the ENB is a target ENB, the control unit 1620 may control a process of determining information on silencing resources so that one or more ENBs do not perform downlink or uplink transmission at specific resources in order to successfully send and receive handover related messages for handover signaling, receiving a handover request message for a UE from the source ENB, and performing handover for the UE.

According to the present invention, the proposed silencing technique may reduce inter-cell interference when the source ENB sends a handover command message to a UE or the UE sends a handover confirm message to the target ENB. Hence, it is possible to raise the probability of successfully receiving handover related messages and to prevent handover delay. In addition, as the silencing technique lowers the possibility of handover failure, the quality of service (QoS) for the user can be enhanced.

Hereinabove, embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method of a radio resource management by a first base station in a mobile communication system, the method comprising:
    transmitting, to at least one second base station, information on at least one resource to which silencing is applicable;
    receiving, from the at least one second base station, information on a resource determined from the at least one resource for silencing;
    determining a resource for silencing based on the received information, so that the at least one second base station does not perform a transmission or a reception except for a handover related message on the resource for silencing when the handover related message is transmitted or received on the resource for silencing; and
    performing a handover for a user equipment (UE) according to the determined resource for silencing.

2. The method of claim 1,
wherein the handover related message is at least one of a handover command message transmitted from a source base station to the UE or a handover confirm message transmitted from the UE to a target base station.

3. The method of claim 1,
wherein the performing of the handover comprises:
 transmitting a handover request message for the UE to a target base station;
 receiving a handover request confirm message for the UE from the target base station;
 transmitting a handover command message to the UE, and
 performing a silencing when the handover confirm message is transmitted from the UE to the target base station, and
wherein the target base station is configured to perform a silencing when the handover command message is transmitted to the UE.

4. The method of claim 1, wherein, when the first base station is a small base station, the determining of the resource for the silencing further comprises:
 transmitting a silencing request message to a third base station;
 receiving a response message rejecting the silencing request from the third base station;
 transmitting a request message for a proxy transmission of a handover command message to a macro base station connected with the first base station; and
 performing a silencing when the macro base station transmits a handover command message to the UE.

5. A method of a radio resource management by a second base station in a mobile communication system, the method comprising:
 receiving, from a first base station, information on at least one resource to which silencing is applicable;
 determining a resource to which a silencing is to be applied from the at least one resource;
 transmitting, to the first base station, information on the resource to which the silencing is to be applied from the at least one resource; and
 performing a handover for a user equipment (UE) according to a resource for silencing,
 wherein the resource for silencing is determined by the first base station based on the resource to which the silencing is to be applied, so that the second base station does not perform a transmission or a reception except for a handover related message on the resource for silencing when the handover related message is transmitted or received on the resource for silencing.

6. The method of claim 5,
wherein the handover related message is at least one of a handover command message transmitted from a source base station to the UE or a handover confirm message transmitted from the UE to a target base station.

7. The method of claim 5, wherein the performing of the handover comprises:
 transmitting, upon receiving a handover request message for the UE from a source base station, a handover request confirm message to the source base station; and
 performing a silencing when the source base station transmits a handover command message to the UE,
 wherein the source base station is configured to perform a silencing when a handover confirm message is transmitted from the UE.

8. The method of claim 5,
wherein the method further comprises:
 receiving a silencing request message from the first base station;
 determining to transmit a handover command message on behalf of the first base station;
 transmitting a silencing response message indicating a proxy transmission of a handover command message to the first base station; and
 transmitting a handover command message to the UE, and
wherein the first base station performs a silencing when the handover command message is transmitted to the UE.

9. A first base station managing radio resources in a mobile communication system, comprising:
 a transceiver; and
 at least one processor configured to:
  control the transceiver to transmit, to at least one second base station, information on at least one resource to which silencing is applicable,
  control the transceiver to receive, from the at least one second base station, information on a resource determined from the at least one resource for silencing,
  determine a resource for silencing based on the received information, so that the at least one second base station does not perform a transmission or a reception except for a handover related message on the resource for silencing when the handover related message is transmitted or received on the resource for silencing, and
  perform a handover for a user equipment (UE) according to the determined resource for silencing.

10. The first base station of claim 9,
wherein the handover related message is at least one of a handover command message transmitted from a source base station to the UE or a handover confirm message transmitted from the UE to a target base station.

11. The first base station of claim 9,
wherein the at least one processor is further configured to:
 control the transceiver to transmit a handover request message for the UE to a target base station,
 control the transceiver to receive a handover request confirm message for the UE from the target base station,
 control the transceiver to transmit a handover command message to the UE, and
 perform a silencing when the handover confirm message is transmitted from the UE to the target base station, and
wherein the target base station performs a silencing when the handover command message is transmitted to the UE.

12. The first base station of claim 9, wherein,
when the first base station is a small base station, the at least one processor is further configured to:
 control the transceiver to transmit a silencing request message to a third base station,
 control the transceiver to receive a response message rejecting the silencing request from the third base station,
 control the transceiver to transmit a request message for a proxy transmission of a handover command message to a macro base station connected with the first base station, and
 perform a silencing when the macro base station transmits a handover command message to the UE.

13. A second base station managing radio resources in a mobile communication system, comprising:
a transceiver; and
at least one processor configured to:
control the transceiver to receive, from a first base station, information on at least one resource to which silencing is applicable,
determine a resource to which a silencing is to be applied from the at least one resource,
control the transceiver to transmit, to the first base station, information on the resource to which the silencing is to be applied from the at least one resource, and
perform a handover for a user equipment (UE) according to a resource for silencing,
wherein the resource for silencing is determined by the first base station based on the resource to which the silencing is to be applied, so that the second base station does not perform a transmission or a reception except for a handover related message on the resource for silencing when the handover related message is transmitted or received on the resource for silencing.

14. The second base station of claim 13,
wherein the handover related message is at least one of a handover command message transmitted from a source base station to the UE or a handover confirm message transmitted from the UE to a target base station.

15. The second base station of claim 13,
wherein the at least one processor is further configured to:
control the transceiver to transmit, upon receiving a handover request message for the UE from a source base station, a handover request confirm message to the source base station, and
perform a silencing when the source base station transmits a handover command message to the UE,
wherein the source base station is configured to perform a silencing when a handover confirm message is transmitted from the UE.

16. The second base station of claim 13,
wherein the at least one processor is further configured to:
control the transceiver to receive a silencing request message from the first base station,
determine to transmit a handover command message on behalf of the first base station,
control the transceiver to transmit a silencing response message indicating a proxy transmission of a handover command message to the first base station, and
control the transceiver to transmit a handover command message to the UE, and
wherein the first base station performs a silencing when the handover command message is transmitted to the UE.

* * * * *